(12) United States Patent
Zimmerman

(10) Patent No.: US 11,251,455 B2
(45) Date of Patent: *Feb. 15, 2022

(54) SOLID IONICALLY CONDUCTING POLYMER MATERIAL

(71) Applicant: IONIC MATERIALS, INC., Woburn, MA (US)

(72) Inventor: Michael A. Zimmerman, No. Andover, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,085

(22) Filed: May 6, 2016

(65) Prior Publication Data

US 2017/0005356 A1   Jan. 5, 2017

Related U.S. Application Data

(63) Continuation-in-part of application No. 14/559,430, filed on Dec. 3, 2014, and a continuation-in-part of application No. 13/861,170, filed on Apr. 11, 2013.

(60) Provisional application No. 62/158,841, filed on May 8, 2015, provisional application No. 61/911,049, filed on Dec. 3, 2013, provisional application No. 61/622,705, filed on Apr. 11, 2012.

(51) Int. Cl.

| | |
|---|---|
| C08J 5/22 | (2006.01) |
| C08K 3/10 | (2018.01) |
| H01M 8/1067 | (2016.01) |
| H01M 10/0525 | (2010.01) |
| H01M 4/62 | (2006.01) |
| H01M 4/58 | (2010.01) |
| H01M 10/26 | (2006.01) |
| H01M 4/48 | (2010.01) |
| H01M 4/24 | (2006.01) |
| H01M 4/36 | (2006.01) |
| H01M 6/18 | (2006.01) |
| H01M 4/04 | (2006.01) |
| H01M 4/42 | (2006.01) |
| H01M 4/06 | (2006.01) |
| H01M 4/50 | (2010.01) |
| B01J 43/00 | (2006.01) |
| B01J 47/12 | (2017.01) |
| H01M 4/38 | (2006.01) |
| H01M 8/1018 | (2016.01) |
| H01M 8/10 | (2016.01) |

(52) U.S. Cl.
CPC ........... *H01M 8/1067* (2013.01); *B01J 43/00* (2013.01); *B01J 47/12* (2013.01); *C08J 5/2256* (2013.01); *C08K 3/10* (2013.01); *H01M 4/0411* (2013.01); *H01M 4/06* (2013.01); *H01M 4/24* (2013.01); *H01M 4/364* (2013.01); *H01M 4/38* (2013.01); *H01M 4/42* (2013.01); *H01M 4/48* (2013.01); *H01M 4/50* (2013.01); *H01M 4/58* (2013.01); *H01M 4/622* (2013.01); *H01M 4/624* (2013.01); *H01M 6/181* (2013.01); *H01M 10/0525* (2013.01); *H01M 10/26* (2013.01); *C08J 2300/12* (2013.01); *C08J 2323/06* (2013.01); *C08J 2327/18* (2013.01); *C08J 2365/00* (2013.01); *C08J 2379/02* (2013.01); *C08J 2381/02* (2013.01); *H01M 2008/1095* (2013.01); *H01M 2300/0082* (2013.01)

(58) Field of Classification Search
CPC ..... H01M 2300/0082; H01M 10/0565; H01M 2300/0094; H01M 6/181; H01M 6/187; H01M 8/1018–1093; C08K 2003/2203
See application file for complete search history.

(56) References Cited

U.S. PATENT DOCUMENTS

| | | | |
|---|---|---|---|
| 2,638,489 A | 5/1953 | Ruben | |
| 3,257,241 A | 6/1966 | Tamminen | |
| 3,336,279 A | 8/1967 | Scott | |
| 4,243,732 A | 1/1981 | Powers et al. | |
| 4,465,744 A | 8/1984 | Susman et al. | |
| 4,804,594 A * | 2/1989 | Jow ...................... | H01M 10/05 429/213 |
| 5,147,739 A | 9/1992 | Beard | |
| 5,160,880 A | 11/1992 | Palanisamy | |
| 5,227,043 A * | 7/1993 | Shakushiro ........... | H01M 6/181 204/421 |
| 5,270,137 A * | 12/1993 | Kubota .............. | B01D 67/0093 429/249 |
| 5,378,560 A | 1/1995 | Tomiyama | |
| 5,424,151 A | 6/1995 | Koksbang et al. | |

(Continued)

FOREIGN PATENT DOCUMENTS

| | | |
|---|---|---|
| CN | 1285086 A | 2/2001 |
| CN | 1326596 A | 12/2001 |

(Continued)

OTHER PUBLICATIONS

Lithium Hydroxide Information. ChemicalBook. http://www.chemicalbook.com/ChemicalProductProperty_EN_CB6260598.htm. As viewed on Apr. 24, 2017.*

(Continued)

*Primary Examiner* — Stephen E Rieth
(74) *Attorney, Agent, or Firm* — Burns & Levinson, LLP; Joseph M. Maraia

(57) ABSTRACT

A solid, ionically conductive, polymer material with a crystallinity greater than 30%; a glassy state; and both at least one cationic and anionic diffusing ion, wherein each diffusing ion is mobile in the glassy state.

12 Claims, 20 Drawing Sheets

(56) References Cited

U.S. PATENT DOCUMENTS

| | | |
|---|---|---|
| 5,462,566 A | 10/1995 | Skotheim |
| 5,506,073 A | 4/1996 | Angell et al. |
| 5,582,937 A | 12/1996 | LaFollette |
| 5,599,355 A | 2/1997 | Nagasubramanian et al. |
| 5,620,811 A | 4/1997 | Zhang et al. |
| 5,648,187 A | 7/1997 | Skotheim |
| 5,713,169 A | 2/1998 | Meier et al. |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,248,474 B1 | 6/2001 | Nishiyama et al. |
| 6,274,261 B1 | 8/2001 | Tinker et al. |
| 6,358,651 B1 | 3/2002 | Chen et al. |
| 6,376,123 B1 | 4/2002 | Chu |
| 6,413,676 B1 | 7/2002 | Munshi |
| 6,451,487 B1 | 9/2002 | Besner et al. |
| 6,455,202 B1 | 9/2002 | Marugan et al. |
| 6,461,724 B1 | 10/2002 | Radovanovic et al. |
| 6,645,675 B1 | 11/2003 | Munshi |
| 6,652,440 B1 | 11/2003 | Kovalev et al. |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,945,432 B2 | 2/2015 | Towns |
| 9,742,008 B2 * | 8/2017 | Zimmerman ......... H01M 4/364 |
| 9,819,053 B1 * | 11/2017 | Zimmerman ..... H01M 10/0565 |
| 10,553,901 B2 | 2/2020 | Zimmerman et al. |
| 10,741,877 B1 | 8/2020 | Zimmerman |
| 10,811,688 B2 | 10/2020 | Zimmerman et al. |
| 11,114,655 B2 | 9/2021 | Zimmerman et al. |
| 11,145,899 B2 | 10/2021 | Zimmerman et al. |
| 11,152,657 B2 | 10/2021 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2004/0023116 A1 | 2/2004 | Fujino et al. |
| 2004/0076881 A1 | 4/2004 | Bowden et al. |
| 2004/0157101 A1 | 8/2004 | Smedley |
| 2004/0241553 A1 | 12/2004 | Abe et al. |
| 2005/0019661 A1 | 1/2005 | Han et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 * | 1/2006 | Shimoyama ........... C08J 5/2256 521/27 |
| 2006/0166085 A1 | 7/2006 | Hennige et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2008/0066297 A1 | 3/2008 | Lin et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2009/0162755 A1 | 6/2009 | Neudecker |
| 2009/0197183 A1 | 8/2009 | Kato |
| 2009/0246636 A1 | 10/2009 | Chiang et al. |
| 2010/0227224 A1 | 9/2010 | Eitouni et al. |
| 2011/0020708 A1 | 1/2011 | Fujiki et al. |
| 2011/0027666 A1 | 2/2011 | Burchardt et al. |
| 2011/0070487 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 | 7/2012 | Wakizaka et al. |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2014/0004431 A1 | 1/2014 | Yamaguchi et al. |
| 2014/0045064 A1 | 2/2014 | Nakai et al. |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera et al. |
| 2016/0365553 A1 | 12/2016 | Kountz et al. |
| 2017/0018781 A1 | 1/2017 | Zimmerman |
| 2017/0092958 A1 | 3/2017 | Zimmerman et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0212232 A1 | 7/2018 | Zimmerman et al. |
| 2018/0219210 A1 | 8/2018 | Kim |
| 2019/0067764 A1 | 2/2019 | Zimmerman et al. |

FOREIGN PATENT DOCUMENTS

| | | |
|---|---|---|
| CN | 1354529 A | 6/2002 |
| CN | 1457518 A | 11/2003 |
| CN | 1592937 A | 3/2005 |
| CN | 1965436 A | 5/2007 |
| CN | 101290985 A | 10/2008 |
| JP | 59-157151 A | 9/1984 |
| JP | 04-267055 A | 9/1992 |
| JP | 9-219197 A | 8/1997 |
| JP | 2002/352799 A | 12/2002 |
| JP | 2003/242964 A | 8/2003 |
| JP | 2004-265675 A | 9/2004 |
| JP | 2005/535076 A | 11/2005 |
| JP | 2006/049122 A | 2/2006 |
| JP | 2006-210089 A | 8/2006 |
| JP | 2006520519 A | 9/2006 |
| JP | 2010/509719 A | 3/2010 |
| JP | 2011-28976 A | 2/2011 |
| JP | 2014-067638 A | 4/2014 |
| JP | 2014-112560 A | 6/2014 |
| KR | 10-2011-0106342 A | 9/2011 |

(56) References Cited

FOREIGN PATENT DOCUMENTS

| | | |
|---|---|---|
| KR | 10-2012-0117853 A | 10/2012 |
| KR | 10-2008-0023294 A | 3/2013 |
| WO | 1998/42037 A1 | 9/1998 |
| WO | 1999/33127 A1 | 7/1999 |
| WO | 2001/17051 A1 | 3/2001 |
| WO | 2001/026175 A1 | 4/2001 |
| WO | 2004/027909 A1 | 4/2004 |
| WO | 2006/019064 A2 | 2/2006 |
| WO | 2011/146670 A1 | 11/2011 |
| WO | 2014/020349 A1 | 2/2014 |
| WO | 2015/084940 A1 | 6/2015 |
| WO | 2015/153729 A1 | 10/2015 |
| WO | 2015/153729 A8 | 10/2015 |
| WO | 20160182884 A | 11/2016 |
| WO | 2016/196873 A1 | 12/2016 |
| WO | 2016/197098 A1 | 12/2016 |
| WO | 20160196477 A | 12/2016 |
| WO | 20160196873 A | 12/2016 |
| WO | 2019/065066 A1 | 4/2019 |

OTHER PUBLICATIONS

DDQ Information. ChemicalBook. http://www.chemicalbook.com/ProductMSDSDetailCB5751792_EN.htm. As viewed on Apr. 24, 2017.*

Lithium Iodide Information. ChemicalBook. http://www.chemicalbook.com/ChemicalProductProperty_EN_cb8688141.htm. As viewed on Apr. 25, 2017.*

Density of Polymers. ScientificPolymer. http://scientificpolymer.com/density-of-polymers-by-density/. As viewed on Mar. 11, 2015.*

Diez-Pascual, A. M. et al. High-performance aminated poly(phenylene sulfide)/ZnO nanocomposites for medical applications. ACS Appl. Mater. Interfaces, 2014, 6, 10132-10145 and supporting information, pp. 1-4. (Year: 2014).*

PBI Information. Polymers: A Property Database 2017. CRC Press, Taylor & Francis Group. (Year: 2017).*

Celazole T-Series: Injection molding thermoplastic polymers. PBI Performance Products, Inc. 2013. (Year: 2013).*

Nohara, L. B. et al. Study of crystallization behavior of poly(phenylene sulfide). Polimeros: Ciencia e Tecnologia, 2006, 16, 104-110. (Year: 2006).*

Brady, D. G. The crystallinity of poly(phenylene sulfide) and its effect on polymer properties. Journal of Applied Polymer Science, 1976, 20, 2541-2551. (Year: 1976).*

Diez-Pascual, A. M. et al. Inorganic nanoparticle-modified poly(phenylene sulphide)/carbon fiber laminates: thermomechanical behaviour. Materials, 2013, 6, 3171-3193. (Year: 2013).*

Zak, A. K. et al. Synthesis and characterization of a narrow size distribution of zinc oxide nanoparticles. International Journal of Nanomedicine, 2011, 6, 1399-1403. (Year: 2011).*

Florjancyz, K, et al) "Polymer-in-Salt Electrolytes . . . " Journal of Physical Chemistry B. vol. 108, p. 14907-14914 Jul. 15, 2004.

Liew, C-W et al.)"Characterization of ionic liquid added polyvinyl alcohol . . . supercapacitors" International Journal of Hydrogen Energy vol. 40 pp. 852-862 Oct. 24, 2014.

Yang, Y et al) "Effect of Lithium Iodide Addition . . . Solar Cell", Journal of Physical Chemistry vol. 112 No. 21, pp. 6594-6602 Mar. 20, 2008.

Lesch, V. et al) "A combined theoretical and experienced study . . . ionic liquids." Journal of Physical Chemistry B. vol. 118 (2014) pp. 1-21.

Kosters, J et al.) "Ion Transport Effects in a Solid Polymer . . . Ionic Liquid;" Journal of Physical Chemistry; vol. 117, pp. 2527-2534; Jan. 30, 2013.

Edman, L. et al) "Transport properties of the Solid Polymer . . . System"; Journal of Physical Chemistry; pp. 1-22, Mar. 8, 2011.

Santosh, P.et al.) "Preparation and properties of new cross-linked . . . lithium batteries". Journal of Power Sources. pp. 1-12, 2006.

OPI Online Courses "Insulator, Semiconductor Conductor" (online) Jul. 1, 2012 (1 page).

Extended European Search Report, dated Dec. 10, 2018, for corresponding EPO Application No. 16793236.7, filed on May 6, 2016.

Helmenstine, A.M., Monomers and Polymers in Chemistry, downloaded from https://www.thoughtco.com/monomers-and-polymers-intro-608928 on Oct. 19, 2018.

Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_TSP-07_Issue3.pdf>. entire document.

Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.

OPI Online Courses, "Insulator, Semiconductor Conductor," (online), Jul. 1, 2012.

Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage=111775702>. entire document.

Solvay. Ryton PPS. Feb. 7, 2015 (Feb. 7, 2015) [retrieved on Aug. 9, 2016]. Retrieved from the Internet: <URL: http://www.solvay.com/en/markets-and-products/featured-products/Ryton-PPS.htmlf>. entire document.

Tokito et al. Electrical Conductivity and Optical Properties of Poly(p-phenylene sulfide) doped with Some Organic Acceptors. Polymer Journal, vol. 17, No. 8, pp. 959-968. 1985. Retrieved from the Internet<URL:HTTP://www.nature.com/pj/journal/v17/n8/pdf/pj 1985103a.pdf.> entire document.

Translated Text of the First Office Action, dated Aug. 7, 2018, from related Chinese Patent Application No. 2015/80018411.6.

Extended European Search Report, dated Oct. 8, 2018, from related European Patent Application No. 16804487.3, filed on Jan. 4, 2018.

Extended European Search Report, dated Oct. 5, 2018, from related European Patent Application No. 16804636.5, filed on Jan. 4, 2018.

Extended European Search Report, dated Dec. 13, 2018, from related European Patent Application No. 16808115.6, filed on Jun. 7, 2016.

Supplementary European Search Report, dated Oct. 15, 2018, from related European Patent Application No. 16808165.1, filed on Jun. 8, 2016.

International Search Report and the Written Opinion of the International Searching Authority, dated Apr. 5, 2018 from related PCT/US2018/015146 filed on Jan. 25, 2018.

Written Opinion of the Singapore Intellectual Property Office, dated Jul. 31, 2018, from related Singapore Patent Application No. SG2018/4525517527Y.

Ahmad et al., Structural studies and ionic conductivity of lithium iodide-lithium tungstate solid electrolytes. Ionics, 2002, 8, 433-438 (2002).

Celazole® T-Series: Injection Molding Thermoplastic Polymers. Brochure of PBI Performance Products, Inc., 2013.

Gal'Perin et al., Determination of the crystallinity of polyvinylidene fluoride. Polymer Science: USSR 1970, 12, 2133-2139 (1970).

Lee et al., PVDF-based nanocomposite solid polymer electrolytes; the effect of affinity between PVDF and filler on ionic conductivity. Composite Interfaces 2009, 16, 347-358.

Lithium Iodide Information. ChemBook. http://www.chemicalbook.com/ChemicalProductProperty_EN_cb8688141.htm. As viewed on Apr. 25, 2017.

PBI Information. Polymers: A Property Database 2017, CRC Press, Taylor & Francis Group (2017).

Polyacrylonitrile Information. ChemicalBook. http://www.chemicalbook.com/ChemicalProductProperty_USCB9199592.aspx. As viewed on Jan. 18, 2018.

Polymer Density Table. ScientificPolymer. http://scientificpolymer.com/density-of-polymers-by-density/. As viewed on Mar. 11, 2015.

Polyvinylidenefluoride (PVDF) Information, Goodfellow, http://www.goodfellow.com/E/Polyvinylidenefluoride.html. As viewed on Jan. 18, 2018.

Spry, R.J. et al., Anisotropic Ionic Conductivity of Lithium-Doped Sulfonated PBI, Journal of Polymer Science: Part B:Polymer Physics, 35, 2925-2933 (1997).

(56) References Cited

OTHER PUBLICATIONS

Suib, S.L., New and future developments in catalysis: Batteries, Hydrogen Storage and Fuel Cells. Elsevier B.V. Jul. 29, 2013, pp. 1-16.
Extended European Search Report, dated Oct. 9, 2018, from related European Application No. EP 16804233, filed on Jan. 2, 2018.
Lefkowitz et al., "Influence of pH on the Reductive Transformation of Birnessite by Aqueous Mn(II)," Environmental Science & Technology, vol. 47, p. 10364-10371, 2013.
Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.
Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.
Yu et al., "Solution-combustion synthesis of epsilo-MnO2 for supercapacitors," Materials Letters, vol. 64, pp. 61-64, Oct. 9, 2009.
International Search Report and Written Opinion, dated Oct. 2, 2019 for related PCT/US2019/038190, filed on Jun. 20, 2019.
Chiu, H.-T et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.
Fedelich, N., Application Handbook Thermal Analysis of Polymers Selected Applications Thermal Analysis, 2013. Retrieved from the Internet: https://www.mt.com/dam/LabDiv/guides-glen/ta-polymer/TA_Polymers_Selected_Apps_EN.pdf.
Imrie, C.T. et al., "Ion Transport in Glassy Polymer Electrolytes," Journal of Physical Chemistry B, vol. 103, pp. 4132-4138, 1999.
Lu, Y. et al., "Platinum-Gold Nanoparticles: A Highly Active Bifunctional Electrocatalyst for Rechargeable Lithium-Air Batteries," Journal of the American Chemical Society vol. 132, No. 35, p. 12170-12171, 2010.
Taib, N. U. et al., "Plastic crystal-solid biopolymer electrolytes for rechargeable lithium batteries," Journal of Membrane Science, vol. 468, pp. 149-154, 2014.

Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).
Wu, G.M. et al., "Alkaline Zn-air and Al-air cells based on novel solid PVA/PAA polymer electrolyte membranes," Journal of Membrane Science, 280, pp. 802-808, Elsevier B.V. (2006; published online Apr. 4, 2006).
Zhang, Z. et al., "All-solid-state Al-air batteries with polymer alkaline gel electrolyte," Journal of Power Sources., 251, pp. 470-475, Elsevier B.V (2014; available online Nov. 20, 2013).
Lithium oxide (Li2O). http://www-ferp.ucsd.edu/LIB/PROPS/PANOS/li2o.html (retrieved on-line Sep. 23, 2020).
Bis(trifluoromethane)sulfonimide lithium salt. https://www.chemodex.com/products/bistrifluoromethanesulfonimide-lithium-salt/ (retrieved on-line Sep. 23, 2020).
Zuo, Z.; Fu, Y.; Manthiram, A. Novel Blend Membranes Based on Acid-Base Interactions for Fuel Cells. Polymers 2012, 4, 1627-1644.
Wu, Y., ed., "Chapter 11: Solid Electrolyte." In Lithium Ion Battery Application and Practice, Chemical Industry Press, China: Chemical Industry Press (2011). Cited in Third Office Action for CN 2015/80018411.6 Art is summarized in the attached foreign Office Action citing the art, and a translation of the summary with a translator signature is attached.
Hayashi, A. et al., "Superionic glass-ceramic electrolytes for room-temperature rechargeable sodium batteries," Nature Communications, 3:856 (May 22, 2012) 1-5.
International Application No. PCT/US2019/063562 International Search Report dated Mar. 25, 2020.
Yi-Chun Lu, et al., "Platinum-Gold Nanoparticles: A Highly Active Bifunctional Electrocatalyst for Rechargeable Lithium-Air Batteries," Journal of the American Chemical Society, vol. 132, No. 35, Sep. 8, 2010, XP055313090, ISSN: 0002-7863, DOI: 10.1021/ja 1036572, Abstract Only.
Yi-Chun Lu, et al. "Catalytic Activity Trends of Oxygen Reduction Reaction for Nonaqueous Li-Air Batteries Supporting Information," Nov. 1, 2011, XP055630428, URL: https://pubs.acs.org/doi/suppl/10.1021 /ja 208608s/suppl_file/ja 208608S-si_001.pdf.
Japanese Office Action dated Nov. 17, 2021, Japanese Application No. 2019-5405343 (9 pages).

* cited by examiner

SOLID IONICALLY CONDUCTING POLYMER MATERIAL

STATEMENT REGARDING FEDERALLY SPONSORED RESEARCH OR DEVELOPMENT (Not Applicable)

FIELD OF THE INVENTION

The present invention generally relates to polymer chemistry and particularly to solid polymer electrolytes and their methods of synthesis.

BACKGROUND OF THE INVENTION

The history of batteries has been one of slow progress and incremental improvements. Battery performance, cost, and safety have historically been conflicting goals, requiring tradeoffs which limit the viability of end applications such as grid-level storage and mobile power. The demand for transformational batteries has reached the level of national interest, driving a massive effort to deliver safe, electrochemical energy storage with higher energy density and lower cost.

Alessandro Volta invented the first true battery which became to be known as the "voltaic pile". This consisted of pairs of zinc and copper discs, piled on top of each other separated by a layer of cloth or cardboard soaked in brine as an electrolyte. This discovery, though not practical, gave rise to the understanding of electrochemical cells and the role of the electrolyte.

Since Volta, inventors have created improvements in liquid electrolytes which are based on a porous separator filled with a concentrated solution of salt, alkali or acid in water or an organic solvent. These liquid electrolytes are typically corrosive and/or combustible and, in many cases, thermodynamically unstable with the electrode materials, resulting in performance limitations and safety hazards. These challenges make solid-state electrolytes enormously attractive for battery development. Solid electrolytes can provide substantial benefits such as non-leakage of the electrolyte, more flexible geometry, higher energy density electrodes, and improved safety.

Ceramics and glasses were the first solid materials to be discovered and developed to have ionic conductivity. Additional materials followed, but all of these materials all have the characteristic that sufficiently high ionic conductivity is only available at very high temperatures. For example, Toyota Japan has announced development work using a new "crystalline superionic crystal" which is a glassy ceramic $Li_{10}GeP_2S_{12}$. However, this material only has high conductivity above 140° C., and ceramics suffer from the usual problems of manufacturability and brittleness. The manufacturing challenges with ceramics would be particularly prohibitive for the incorporation of the material into battery electrodes.

Initial interest in polymer electrolytes was sparked in 1975 by Professor Peter V. Wright's discovery that complexes of polyethylene oxide (PEO) can conduct metal ions. Shortly after that, Professor Michel Armand recognized the potential use of PEO-lithium salt complexes for battery applications. The combination of PEO and lithium salts has been in development for a number of years. An example of this material is a $P(EO)_n$ LiBETI complex. For the past thirty years, there have been numerous attempts to improve the conductivity of Polyethene Oxide $(PEO)\text{-}(CH_2CH_2O)_n\text{---}$. In these PEO based materials, cation mobility is governed by polymer segmental motion. This segmental motion of PEO is effectively a liquid-like mechanism, but chain entanglements and partial crystallinity can give the electrolyte some bulk properties of a solid. However, segmental motion is essential for PEO to be ionically conductive.

Plasticized polymer-salt complex are prepared by adding liquid plasticizers into PEO in such a way that a compromise between solid polymer and liquid electrolyte exists. The magnitude of ambient conductivity gets substantially enhanced because segmental motion is increased, but at the cost of deterioration in the mechanical integrity of the film as well as increased corrosive reactivity of polymer electrolyte towards the metal electrode.

Gel electrolytes are obtained by incorporating large amount of liquid solvent(s)/liquid plasticizer into a polymer matrix capable of forming a gel with the polymer host structure. The liquid solvent remains trapped within the matrix of the polymer and forms a liquid conductive pathway through the otherwise non-conductive solid polymer. Gel electrolytes can offer high ambient conductivities but suffer from similar disadvantages as mentioned for the plasticized polymer electrolytes.

Rubbery electrolytes are actually 'polymer-in-salt' systems, in contrast to 'salt-in-polymer,' in which, a large amount of salt is mixed with a small amount of polymer, namely, poly(ethylene oxide) (PEO), poly(propylene oxide) (PPO), etc. The glass transition temperature of these materials can be low to maintain the rubbery or viscoelastic state at room temperature which in turn provides high conductivity by enhancement of segmental motion. However, the complexed/dissolved salts can have a tendency to crystallize, hence, hampering their uses in practical electrochemical devices.

Composite polymer electrolytes are prepared simply by dispersing a small fraction of micro/nanosize inorganic (ceramic)/organic filler particles into the conventional polymer host. The polymer acts as a first phase, while filler materials are dispersed in a second phase. As a consequence of dispersal, the ionic conductivity, mechanical stability and the interfacial activity can be enhanced. The ionic conductivity is attributed to the decrease in the level of polymer crystallinity in the presence of the fillers, and the corresponding increase in segmental motion.

Polyelectrolytes include charged groups which are covalently bonded to the polymer backbone, which allow opposite charged ions to be very mobile. The charged group is flexible via segmental motion which is required for cationic diffusivity.

Other polymer electrolytes include Rod-Coil Block polyimides (NASA research) and various polymer/liquid blends (ionic liquid/PVDF-HFPs). Unfortunately, low conductivity at room temperature excludes all of these known polymer electrolytes from practical applications because of their need for segmental motion to enable ionic conductivity. Since typical polymer electrolyte ionic conductivity relies on segmental motion above the material's glass transition temperature ($T_g$), all attempts to make a useful solid polymer electrolyte have been focused on suppressing the crystalline phase and/or reduction of the temperature where the glassy state transitions to a state (i.e. viscoelastic or rubbery) where segmental motion is enabled.

In polymer-salt complexes where both crystalline and amorphous phases exist, ion transport occurs in the amorphous phase. The Vogel-Tamman-Fulcher (VTF) equation describes the behavior of diffusion of ions through polymers. The VTF equation is based on the assumption that ions are transported by the semi random motion of short polymer segments. The onset of such segmental motion occurs as the temperature is raised above the glass transition temperature, Tg, and becomes more rapid as the temperature is raised higher in the viscoelastic state. The segmental motions are thought to promote ion motion by both disrupting the solvation of the ion relative multiple coordination sites on the polymer and providing space or free volume into which the ion may diffuse. The fact that polymer segmental motion is necessary for ion transport has typically required that such complexes focus on amorphous materials with low glass transition temperatures.

SUMMARY OF THE INVENTION

According to one aspect, a solid, ionically conductive, polymer material is provided that comprises a crystallinity greater than 30%; a melting temperature; a glassy state; and both at least one cationic and anionic diffusing ion, wherein each diffusing ion is mobile in the glassy state. The material may further comprise a plurality of charge transfer complexes and a plurality of monomers, wherein each charge transfer complex is positioned on a monomer.

In an aspect, a solid, semicrystalline, ionically conductive, polymer material is provided having: a plurality of monomers; a plurality of charge transfer complexes, wherein each charge transfer complex is positioned on a monomer. The material may have a crystallinity greater than 30%; a glassy state which exists at temperatures below the material melting temperature; and both a cationic and anionic diffusing ion, whereby each diffusing ion is mobile in the glassy state.

According to further aspects of the solid, ionically conductive, polymer material, the aspects of the material may include one or more of the following:

The charge transfer complex is formed by the reaction of a polymer and an electron acceptor;

The material has a glassy state, and at least one cationic and at least one anionic diffusing ion, wherein each diffusing ion is mobile in the glassy state;

The material has at least three diffusing ions;

The material includes more than one anionic diffusing ion;

The melting temperature of the material is greater than 250° C.;

The ionic conductivity of the material is greater than $1.0 \times 10^{-5}$ S/cm at room temperature;

The material comprises a single cationic diffusing ion, wherein the diffusivity of the cationic diffusing ion is greater than $1.0 \times 10^{-12}$ m$^2$/s at room temperature;

The material comprises a single anionic diffusing ion, wherein the diffusivity of the anionic diffusing ion is greater than $1.0 \times 10^{-12}$ m$^2$/s at room temperature;

The material, wherein at least one cationic diffusing ion comprises an alkali metal, an alkaline earth metal, a transition metal, or a post transition metal;

The material includes at least one anionic diffusing ion per monomer;

The material includes at least one cationic diffusing ion per monomer;

The material includes at least one mole of the cationic diffusing ion per liter material;

The charge transfer complex of the material is formed by the reaction of a polymer, electron acceptor, and an ionic compound, wherein each cationic and anionic diffusing ion is a reaction product of the ionic compound;

The material is formed from at least one ionic compound, wherein the ionic compound comprises each cationic and anionic diffusing ion;

The material is a thermoplastic;

The material's cationic diffusing ion comprises lithium;

The material's at least one cationic and anionic diffusing ion have a diffusivity, wherein the cationic diffusivity is greater than the anionic diffusivity;

The material's cationic transference number of the material is greater than 0.5 and less than 1.0;

The material's concentration of cationic diffusing ion is greater than 3 moles of cation per liter of material;

The material's cationic diffusing ion comprise lithium;

The material's diffusing cation is monovalent;

The valence of the diffusing cationic ion is greater than one;

The material includes greater than one diffusing anion per monomer;

The material's diffusing anion is a hydroxyl ion;

The material's diffusing anion is monovalent;

The material's diffusing anion and the diffusing cation are monovalent;

The material's at least one cationic and anionic diffusing ion have a diffusivity, wherein the anionic diffusivity is greater than the cationic diffusivity;

The material's cationic transference number of the material is equal to or less than 0.5, and greater than zero;

The material's at least cationic diffusing ion, has a diffusivity greater than $1.0 \times 10^{-12}$ m$^2$/s;

The material's at least one anionic diffusing ion has a diffusivity greater than $1.0 \times 10^{-12}$ m$^2$/s;

The material's at least one anionic diffusing ion and at least one cationic diffusing ion has a diffusivity greater than $1.0 \times 10^{-12}$ m$^2$/s;

Each monomer of the material comprises an aromatic or heterocyclic ring structure positioned in the backbone of the monomer;

The material further includes a heteroatom incorporated in the ring structure or positioned on the backbone adjacent the ring structure;

The material's included heteroatom is selected from the group consisting of sulfur, oxygen or nitrogen;

The material's heteroatom is positioned on the backbone of the monomer adjacent the ring structure;

The material's heteroatom is sulfur.

The material is pi-conjugated;

The material's at least anionic diffusing ion per monomer, and wherein at least one monomer comprises a lithium ion;

The material comprises a plurality of monomers, wherein the molecular weight of the monomer is greater than 100 grams/mole;

The material is hydrophilic;

The ionic conductivity of the material is isotropic;

The material has an ionic conductivity greater than $1 \times 10^{-4}$ S/cm at room temperature;

The material has an ionic conductivity greater than $1 \times 10^{-3}$ S/cm at 80° C.;

The material has an ionic conductivity greater than $1 \times 10^{-5}$ S/cm at −40° C.;

The material's cationic diffusing ion comprises lithium, and wherein the diffusivity of lithium ion is greater than $1.0 \times 10^{-13}$ m$^2$/s at room temperature;

The material in non-flammable;

The material is not reactive when mixed with a second material wherein the second material is selected from a group comprising a electrochemically active material, an electrically conductive material, a rheological modifying material, and a stabilizing material;

The material is in the shape of a film;

The Young's modulus of the material is equal to or greater than 3.0 MPa;

The material becomes ionically conductive after being doped by an electron acceptor;

The material becomes ionically conductive after being doped by an electron acceptor in the presence of an ionic compound that either contains both the cationic and anionic diffusing ion or is convertible into both the cationic and anionic diffusing ion via oxidation by the electron acceptor;

The material is formed from the reaction product of a base polymer, electron acceptor and an ionic compound;

The material's base polymer is a conjugated polymer;

The material's base polymer is PPS or a liquid crystal polymer;

The material's ionic compound reactant is an oxide, chloride, hydroxide or a salt;

The material's charge transfer complex is formed by the reaction of an electron acceptor and a polymer; and The material's reactant electron acceptor is a Quinone or oxygen.

In an aspect, a solid, ionically conducting macromolecule and a material including the macromolecule is provided which is comprised of:

a plurality of monomers, wherein each monomer comprises an aromatic or heterocyclic ring structure;

a heteroatom either incorporated in the ring structure or positioned adjacent the ring structure;

a cationic and anionic diffusing ion, wherein both the cationic and anionic diffusing ions are incorporated into the structure of the macromolecule;

wherein both the cationic and anionic can diffuse along the macromolecule;

wherein there is no segmental motion in the polymer material when a cationic or anionic diffuse along the macromolecule.

Further this aspect may include on or more of the following:

The material has an ionic conductivity greater than $1\times10^{-4}$ S/cm;

The molecular weight of each monomer is greater than 100 grams per mole;

The material's at least one cationic diffusing ion comprises an alkali metal, an alkaline earth metal, a transition metal, or a post transition metal.

An aspect is a method of making a solid, ionically conductive, polymer material, comprising the steps of: mixing a base polymer comprised of a plurality of monomers, an electron acceptor and a ionic compound to create a first mixture; heating the first mixture to create the solid, ionically conductive, polymer material.

A further aspect is a method of making a solid, ionically conductive, polymer material, comprising the steps of: mixing a polymer comprised of a plurality of monomers, and a compound comprising ions to create a first mixture; doping the first mixture with an electron acceptor to create a second mixture; and heating the second mixture.

A further aspect is a method of making a solid, ionically conductive, polymer material, comprising the steps of: mixing a polymer comprised of a plurality of monomers, and an electron acceptor to create a first mixture; heating the first mixture to create an intermediate material comprising charge transfer complexes; mixing the intermediate material with a compound comprising ions to create the solid, ionically conductive, polymer material.

Further aspects of the methods of making a solid, ionically conductive, polymer material may include one of more of the following:

An annealing step, wherein in the annealing step the crystallinity of the base polymer is increased;

The base polymer comprises a plurality of monomers, and wherein the molar ratio of monomer to electron acceptor is equal to or greater than 1:1;

The base polymer has a glass transition temperature, and wherein the glass transition temperature of the base polymer is greater than 80° C.;

The weight ratio of the base polymer and the ionic compound in the mixing step is less than 5:1;

Positive pressure is applied to the mixture in the heating step;

In the heating step, the mixture undergoes a color change;

In the heating step, charge transfer complexes are formed;

An additional mixing step of mixing the solid, ionically conductive polymer material with a second material;

An extruding step, wherein the solid, ionically conductive, polymer material is extruded; and An ion conducting step, wherein the solid, ionically conductive, polymer material transports at least one ion.

Further aspects include: An electrochemically active material composite comprising the material of previous aspects, and an electrochemically active material;

An electrode comprising the material of previous aspects;

A battery comprising the material of previous aspects;

A fuel cell comprising the material of previous aspects;

An electrolyte comprising the material of previous aspects;

An apparatus for conducting ions comprising the material of previous aspects;

A process for conducting ions comprising the material of previous aspects; and

A process for separating ions comprising the material of previous aspects;

In a further aspect, a new ionic conduction mechanism which enables ionic conduction in both the crystalline phase and the amorphous glassy state of a polymer, which enables a solid polymer material with the conductivity of a liquid at room temperature;

And allows the creation of composite anodes and cathodes containing the polymer and electrochemically active compounds for increased capacity and cycle life;

Enables the use of abundant and low cost active materials; and

Allows for a new battery manufacture methods using low cost, high volume extrusion and other plastic processing techniques.

These and other aspects, features, advantages, and objects will be further understood and appreciated by those skilled in the art by reference to the following specification, claims, and appended drawings.

DETAILED DESCRIPTION OF THE PREFERRED EMBODIMENTS

Figure 1:
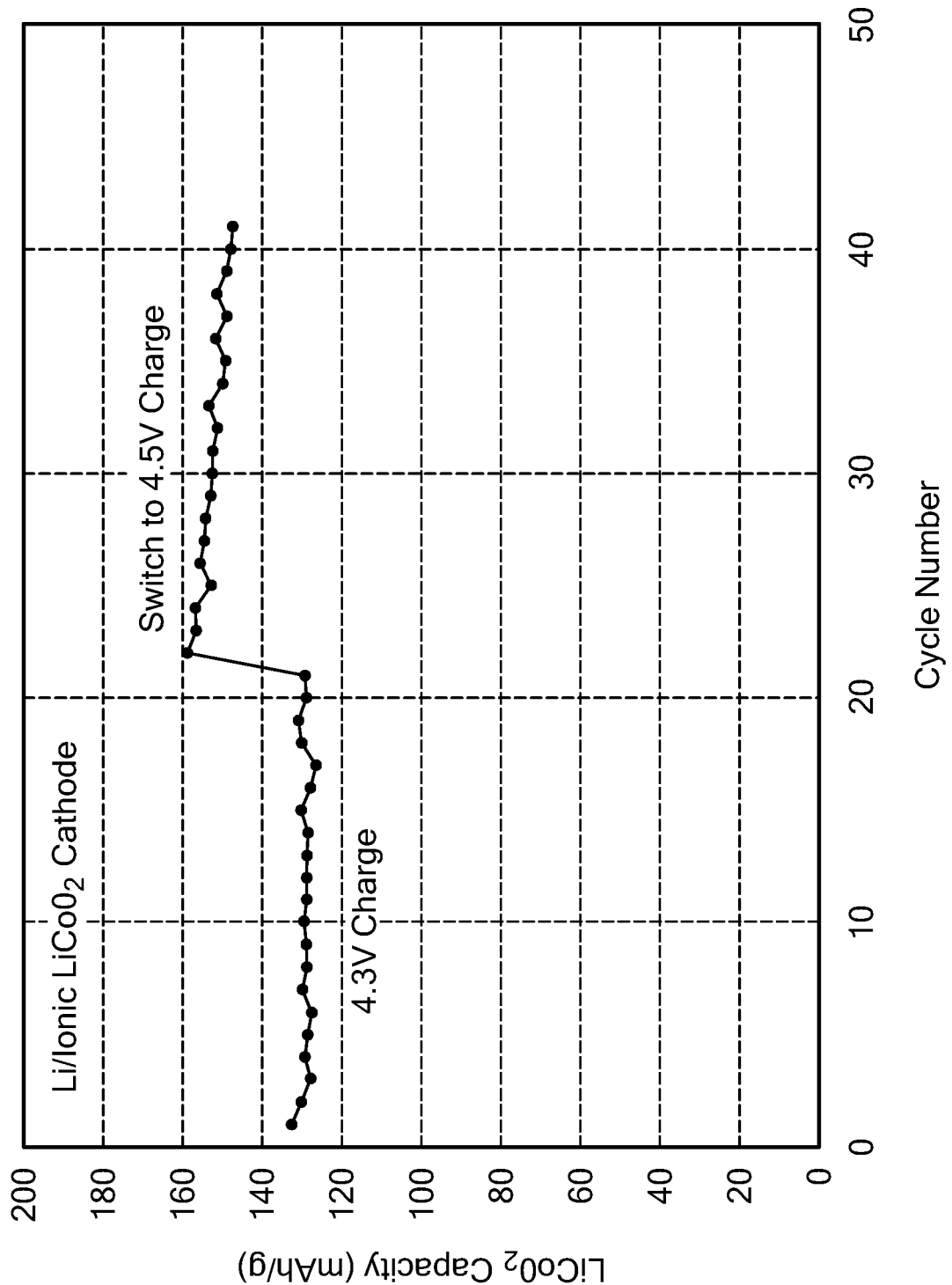
FIG. 1 is a plot of a cycle test of Lithium Ion cells using LCO cathodes containing the solid, ionically conductive, polymer material.

The present patent application claims priority from U.S. Provisional Patent Application No. 62/158,841, filed May 8, 2015; and is a continuation-In-Part application of both (a) U.S. patent application Ser. No. 14/559,430, filed Dec. 3, 2014, which claims priority from U.S. Provisional Patent Application No. 61/911,049, filed Dec. 3, 2013; and (b) from U.S. patent application Ser. No. 13/861,170, filed Apr. 11, 2013, which claims priority from U.S. Provisional Patent Application No. 61/622,705, filed Apr. 11, 2012, the disclosures of which are incorporated by reference herein in their entirety.

The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material. When an electrode has more than one electroactive substances they can be referred to as codepolarizers.

Thermoplastic is a characteristic of a plastic material or polymer to become pliable or moldable above a specific temperature often around or at its melting temperature and to solidify upon cooling.

Solid electrolytes include solvent free polymers, and ceramic compounds (crystalline and glasses).

A "Solid" is characterized by the ability to keep its shape over an indefinitely long period, and is distinguished and different from a material in a liquid phase. The atomic structure of solids can be either crystalline or amorphous. Solids can be mixed with or be components in composite structures. However, for purposes of this application and its claims, a solid material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes in that they rely on a liquid phase for their ionic conductivity.

A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1 \times 10^{-14}$ m²/s and preferably at least $1 \times 10^{-3}$ m²/s, which both communicate an ion is mobile in a material.

A solid polymer ionically conducting material is a solid that comprises a polymer and that conducts ions as will be further described.

An aspect of the present invention includes a method of synthesizing a solid ionically conductive polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesis the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conducting polymer material in a single step. However, this heating step can be done when in a separate step from any mixing or can completed while mixing is being done. The heating step can be performed regardless of the form of the mixture (e.g. film, particulate, etc.) In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete. Additional heating past synthesis does not appear to negatively affect the material.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of a film containing the polymer and ionic compound and other doping methods known to those skilled in the art. Upon doping the solid polymer material becomes ionically conductive, and it is believed that he doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conductive polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{-20}$ S cm$^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Co-polymers including monomers of the listed polymers and mixtures of these polymers may also be used. For example, copolymers of p-hydroxybenzoic acid can be appropriate liquid crystal polymer base polymers. Table 1 details non-limiting examples of reactant polymers useful in the present invention along with monomer structure and some physical property information which should be considered also non-limiting as polymers can take multiple forms which can affect their physical properties.

TABLE 1

| Polymer | Monomer Structure | Melting Pt. (C.) | MW |
| --- | --- | --- | --- |
| PPS polyphenylene sulfide | | 285 | 109 |
| PPO Poly(p-phenylene oxide) | | 262 | 92 |
| PEEK Polyether ether ketone | | 335 | 288 |
| PPA Polyphthalamide | | 312 | |
| Polypyrrole | | | |
| Polyaniline Poly-Phenylamine $[C_6H_4NH]_n$ | | 385 | 442 |
| Polysulfone | | | 240 |
| Xydar (LCP) | | | |
| Vectran Poly-paraphenylene terephthalamide $[-CO-C_6H_4-CO-NH-C_6H_4-NH-]_n$ | | | |
| Polyvinylidene fluoride (PVDF) | | 177° C. | |
| Polyacrylonitrile (PAN) | | 300° C. | |

TABLE 1-continued

| Polymer | Monomer Structure | Melting Pt. (C.) | MW |
|---|---|---|---|
| Polytetrafluoro-ethylene (PTFE) | $-(CF_2-CF_2)_n-$ | 327 | |
| Polyethylene (PE) | $-(CH_2-CH_2)_n-$ | 115-135 | |

Dopants that are useful as reactants in the synthesis of the solid ionically conductive polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur trioxide ("$SO_3$"), ozone (trioxygen or $O_3$), oxygen ($O_2$, including air), transition metal oxides including manganese dioxide ("$MnO_2$"), or any suitable electron acceptor, etc. and combinations thereof. Dopants are those that are temperature stable at the temperatures of the synthesis heating step are useful, and quinones and other dopants which are both temperature stable and strong oxidizers quinones are most useful. Table 2 provides a non-limiting listing of dopants, along with their chemical diagrams.

TABLE 2

| Dopant | Formula | Structure |
|---|---|---|
| 2,3-Dichloro-5,6-dicyano-1,4-benzoquinone (DDQ) | $C_6Cl_2(CN)_2O_2$ | (structure shown) |
| tetrachloro-1,4-benzoquinone (chloranil) | $C_6Cl_4O_2$ | (structure shown) |
| Tetracyano-ethylene (TCNE) | $C_6N_4$ | (structure shown) |

TABLE 2-continued

| Dopant | Formula | Structure |
|---|---|---|
| Sulfur Trioxide | $SO_3$ | |
| Ozone | $O_3$ | |
| Oxygen | $O_2$ | |
| Transition Metal Oxides | $MO_2$ (M = Transition Metal) | |

Ionic compounds that are useful as reactants in the synthesis of the solid ionically conductive polymer material are compounds that release desired ions during the synthesis of the solid ionically conductive polymer material. The ionic compound is distinct from the dopant in that both an ionic compound and a dopant are required. Non-limiting examples include $Li_2O$, LiOH, ZnO, $TiO_2$, $Al_3O_2$, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl)imide), Lithium bis(oxalato)borate (LiB$(C_2O_4)_2$ "LiBOB") and other lithium salts and combinations thereof. Hydrated forms (e.g. monohydrate) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred. The particular ionic compound included in the synthesis depends on the utility desired for the material. For example, in an application where it would be desired to have a lithium cation, a lithium hydroxide, or a lithium oxide convertible to a lithium and hydroxide ion would be appropriate. As would be any lithium containing compound that releases both a lithium cathode and a diffusing anion during synthesis. A non-limiting group of such lithium ionic compounds includes those used as lithium salts in organic solvents. Similarly, an aluminum or other specific ionic compound reacts to release the specific desired ion and a diffusing anion during synthesis in those systems where an aluminum or other specific cation is desired. As will be further demonstrated, ionic compounds including alkaline metals, alkaline earth metals, transition metals, and post transition metals in a form that can produce both the desired cationic and anionic diffusing species are appropriate as synthesis reactant ionic compounds.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are preferred, and purities greater than 98% are more preferred with even higher purities, e.g. LiOH: 99.6%, DDQ: >98%, and Chloranil: >99% most preferred.

To further describe the utility of the solid ionically conductive polymer material and the versatility of the above described method of the synthesis of the solid ionically conductive polymer material of the present invention, several classes of the solid ionically conductive polymer material useful for multiple electrochemical applications and distinguished by their application are described:

Lithium Ion Batteries

In this aspect, the reacting or base polymer is characterized as semicrystalline or fully crystalline and having a crystallinity value of between 30% and 100%, and preferably between 50% and 100%. The base polymer has a glass transition temperature of above 80° C. and preferably above 120° C., and more preferably above 150° C., and most preferably above 200° C. The base polymer has a melting temperature of above 250° C., and preferably above 280° C., and more preferably above 320° C. The molecular weight of the monomeric unit of the base polymer of the invention is in the 100-200 gm/mol range and can be greater than 200 gm/mol. Typical materials that can be used for the base polymer include liquid crystal polymers and polyphenylene sulfide also known as PPS, or semi-crystalline polymer with a crystallinity index greater than 30%, and preferably greater than 50%.

In this aspect, the dopant is an electron acceptor, such as, DDQ, TCNE, chloranil and sulfur trioxide (SO3). The electron acceptor can be "pre-mixed" with all other ingredients and extruded without post-processing or alternatively, a doping procedure such as vapor doping can be used to add the electron acceptor to the composition after other components are mixed such as in an extruder and formed into a film.

Typical compounds including an ion source or "ionic compounds" for use in this aspect of the invention include, but are not limited to, $Li_2O$, LiOH, ZnO, $TiO_2$, $Al_3O_2$, LiTFSI, and other lithium ionic compounds and combinations thereof. The ionic compounds contain appropriate ions in stable form which are modified to release the ions during synthesis of the solid, ionically conducting polymer material.

Example 1

PPS and chloranil powder are mixed in a 4.2:1 molar ratio (base polymer monomer to dopant ratio greater than 1:1). The mixture is then heated in argon or air at a high temperature [up to 350° C.] for twenty-four (24) hours at atmospheric pressure. A color change is observed confirming the creation of charge transfer complexes in the polymer-dopant reaction mixture. The reaction mixture is then reground to a small average particle size between 1-40 micrometers. LiTFSI is then mixed with the reaction mixture to create the synthesized solid, ionically conducting polymer material.

Example 2

Lithium cobalt oxide ($LiCoO_2$)("LCO") cathodes were prepared containing the synthesized material from Example 1. The cathodes used a high loading of 70% LCO by weight which is mixed with the solid ionically conductive polymer material and an electrically conducting carbon. Cells were prepared using lithium metal anodes, porous polypropylene separator and a standard Li-ion liquid electrolyte composed of LiPF6 salt and carbonate-based solvents. The cells were assembled in a dry glovebox and cycle tested.

The capacity in terms of the weight in grams of LCO used in these cells is displayed in FIG. 1. It can be seen that the capacity was stable when charged to 4.3 V, and consistent with the target of 0.5 equivalents of Li removed from the cathode during charging. The cell was also cycled to a higher charge voltage of 4.5V, which utilizes a higher percentage of lithium from the cathode, and resulted in the high capacity of >140 mAh/g. The slight drop in capacity with cycle number observed for the 4.5V charge tests is consistent with decomposition (i.e. non-stable) of the liquid electrolyte at this high voltage. Overall, the performance of the LCO cathode containing the material of the present invention is favorably comparable to a slurry coated LCO cathode.

Alkaline Batteries

The base polymer of the solid, ionically conducting polymer material having mobility for hydroxyl ions is preferably a crystalline or semi-crystalline polymer, which typically has a crystallinity value above 30% and up to and including 100%, and preferably between 50% and 100%. The base polymer of this aspect of the invention has a glass transition temperature above 80° C., and preferably above 120° C., and more preferably above 150° C., and most preferably above 200° C. The base polymer has a melting temperature of above 250° C., and preferably above 280° C., and more preferably above 300° C.

The dopant of the solid, ionically conducting polymer material having mobility for hydroxyl ions is an electron acceptor or oxidant. Typical dopants for use in this aspect of the invention are DDQ, chloranil, TCNE, $SO_3$, Oxygen (including Air), $MnO_2$ and other metal oxides etc.

The compound including an ion source of the solid, ionically conducting polymer material having mobility for hydroxyl ions includes a salt, a hydroxide, an oxide or other material containing hydroxyl ions or convertible to such materials, including, but not limited to, LiOH, NaOH, KOH, $Li_2O$, $LiNO_3$, etc.

Example 3

PPS polymer was mixed with the ionic compound LiOH monohydrate in the proportion of 67% to 33% (by wt.), respectively, and mixed using jet milling. DDQ dopant was added via vapor doping to the resulting mixture in the amount of 1 mole of DDQ per 4.2 moles of PPS monomer. The mixture was heat treated at 190-200° C. for 30 minutes under moderate pressure (500-1000 PSI).

Composite MnO2 Cathode

In this aspect of the invention related to manufacture of a solid ionically conducting polymer material—MnO2 composite cathode, the base polymer can be a semicrystalline having a crystallinity index greater than 30% or a fully crystalline polymer, and can be selected from a group which consists of a conjugated polymer or a polymer which can easily be oxidized with a selected dopant. Non-limiting examples of the base polymers used in this aspect of the invention include PPS, PPO, PEEK, PPA, etc.

In this aspect, the dopant is an electron acceptor or oxidant. Non-limiting examples of dopants are DDQ, chloranil, tetracyanoethylene also known as TCNE, SO3, ozone, oxygen, air, transition metal oxides, including MnO2, or any suitable electron acceptor, etc.

In this aspect, the compound including the ion source is a salt, a hydroxide, an oxide or other material containing hydroxyl ions or convertible to such materials, including, but not limited to, LiOH, NaOH, KOH, Li2O, LiNO3, etc.

Example 4

PPS polymer and LiOH monohydrate were added together in the proportion of 67% to 33% (by wt.), respectively, and mixed using jet milling. Additional alkaline battery cathode components were additionally mixed: $MnO_2$, $Bi_2O_3$ and conductive carbon. $MnO_2$ content varied from 50 to 80 wt %, $Bi_2O_3$ ranged from 0 to 30 wt. %, carbon black amount was 3-25 wt % and polymer/LiOH content was 10-30 wt %.

The mixture was heated to synthesize an alkaline battery cathode comprising the solid ionically conducting polymer material which is useful in a typical zinc-manganese dioxide alkaline battery.

Example 5

A zinc-manganese dioxide alkaline cell was created using the cathode of Example 4 and a commercial non-woven separator (NKK), Zn foil anode, and 6M LiOH solution as an electrolyte.

The cell was discharged under constant current conditions of 0.5 mA/cm2 using a Bio-Logic VSP 15 test system. The specific capacity of MnO2 was found to be 303 mAh/g or close to theoretical 1e– discharge.

Metal Air Battery

In this aspect, the solid ionically conducting polymer material is used in a metal air battery, and comprises a base polymer, a compound comprising an ion source and a dopant. The polymer can be selected from the group PPS, LCP, Polypyrrole, Polyaniline, and Polysulfone and other base polymers.

The dopant may be an electron acceptor or compound containing functional electron acceptor groups capable of initiating an oxidizing reaction with the polymer. Typical dopants are DDQ, chloranil, TCNE, SO3, ozone, and transition metal oxides, including MnO2. The material comprising ion source can be in a form of salt, hydroxide, oxide or other material containing hydroxyl ions or convertible to such materials, including, but not limited to, LiOH, NaOH, KOH, Li2O, LiNO3, etc.

Example 6

The material synthesized in Example 3 was used to prepare air electrodes by mixing the solid ionically conductive polymer material with a variety of carbons—Specifically: TIMCAL SUPER C45 Conductive Carbon Black (C45), Timcal SFG6 (synthetic graphite), A5303 carbon black from Ashbury, and natural vein graphite nano 99 from Ashbury (N99). Carbon content was varied from 15 to 25% wt. %.

Cathodes were punched to fit a 2032 coin cell. Zinc foil was used as the anode. Non-woven separator was soaked with aqueous 40% KOH solution. Two holes were drilled in the coin top facing the cathode. Cells were discharge at room temperature using a MTI coin cell tester at a 0.5 mA constant current.

Figure 2:
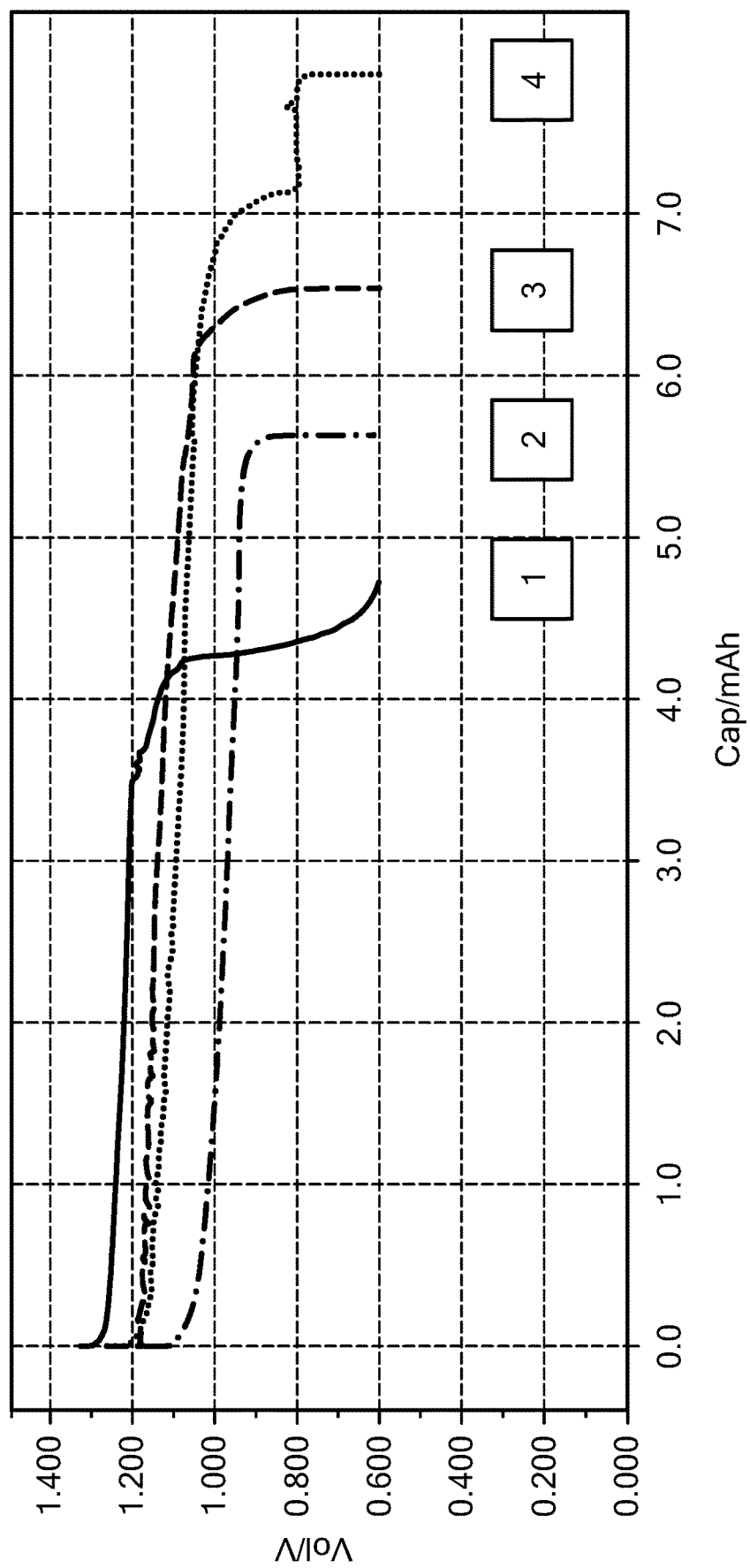
FIG. 2 is a plot of a discharge curve for Example 6.

Cathode parameters and test results are summarized in the Table 3. Discharge curves are shown at FIG. 2. The cells with the air cathode of this example made using the material of the present invention demonstrate typical discharge behavior for Zn-air cells without any traditional catalyst (transition metal based) added to the mixture. In addition to conducting hydroxyl ions from the air cathode to the anode, the material acts to catalyze the formation of the hydroxyl ions from the oxygen present at the cathode surface. As demonstrated by this example, the material of the present invention possesses catalytic functionality.

TABLE 3

| # | Carbon | C % | T (mil) | Wt (mg) | g/cc | OCV (V) | mAh |
|---|--------|-----|---------|---------|------|---------|-----|
| 1 | C45    | 15% | 23.3    | 102.7   | 0.553 | 1.2667 | 5.628 |
| 2 | N99    | 5%  | 25.3    | 137.8   | 0.757 | 1.3343 | 4.742 |
| 3 | A5303  | 20% | 21.5    | 116.8   | 0.755 | 1.3405 | 7.864 |
| 4 | SFG6   | 25% | 29.2    | 166.3   | 0.791 | 1.3185 | 6.539 |

Other Ionic Compounds

Numerous anions and cations can be conducted by the material of the present invention. The ionic compound used in the synthesis can be chosen so that the desired diffusing ions are included in the synthesized material.

Example 7

Material samples were made by mixing LCP polymer [SRT900?] and an ionic compound in various proportions. DDQ was used a dopant. Molar ratio of polymer monomer to dopant was 4.2:1. is listed in Table 4. Mixtures were heat treated at 190-200 C for 30 minutes under moderate pressure (500-1000 psi).

Samples were sandwiched between stainless steel electrodes and placed in test fixture. AC impedance was recorded in the range from 800 KHz to 100 Hz using Bio-Logic VSP test system to determine the electrolyte conductivity.

Results are shown in Table 3 below. High observed ionic conductivity demonstrates that the solid polymer material can conduct multiple ions, including lithium $Li^+$, potassium $K^+$, sodium $Na^+$, calcium $Ca^{2+}$, magnesium $Mg^{2+}$, aluminum $Al^{3+}$, hydroxyl $OH^-$ and chloride $Cl^-$ ions.

TABLE 4

| Ion Source | Ion Source Wt. % | Conductivity (S/cm) |
|------------|------------------|---------------------|
| $Li_2O$    | 33%              | 1.9E−04             |
| $Na_2O$    | 33%              | 4.2E−05             |
| MgO        | 33%              | 6.3E−07             |
| $CaCl_2$   | 33%              | 6.2E−03             |
| $MgCl_2$   | 20%              | 8.0E−03             |
| $AlCl_3$   | 15%              | 2.4E−03             |
| NaOH       | 50%              | 1.3E−04             |
| KOH        | 50%              | 2.2E−04             |

Any ionic compound that can be disassociated by the dopant can be used as long as the dissociated ions are desirable in the applicable electrochemical application the material is used in. The anion and cationic derived from the ionic compound are thus ionically conducted by the material. The ionic compound include oxides, chlorides, hydroxides and other salts. In this example the metal (or other cation) oxides yield the metal (or other cation) cation and hydroxyl ions.

Ability to conduct a plurality of ions in addition to the lithium cation opens new applications for the material of the present invention. Sodium- and potassium-based energy storage systems are viewed as alternative to Li-ion, driven primarily by low cost and relative abundance of the raw materials. Calcium, magnesium and aluminum conductivity is necessary for multivalent intercalation systems, potentially capable of increasing energy density beyond capabilities of Li-ion batteries. There is also a possibility to utilize such materials to create power sources with metal anodes, more stable, safer and less costly than lithium.

Example 8

Additional solid ionically conductive polymer materials are listing in Table 5 which were prepared using the synthesis method of Example 1, along with their reactants and associated ionic conductivity (EIS method).

TABLE 5

| Polymer (base) | Dopant | Ionic Compound (Wt %) | | | Ionic Conductivity (S/cm) |
|---|---|---|---|---|---|
| PPS | Chloranil | LiTFSI (12) | | | 6.0E−04 |
| PPS | Chloranil | LiTFSI (4) | | LiBOB(1) | 2.2E−04 |
| PPS | Chloranil | LiTFSI (10) | | LiBOB(1) | 7.3E−04 |
| PPS | Chloranil | LiTFSI (10) | | LiBOB(1) | 5.7E−04 |
| PPS | Chloranil | | LiFSI (10) | LiBOB(1) | 8.8E−04 |
| PPS | Chloranil | LiTFSI (5) | LiFSI (5) | LiBOB(1) | 1.3E−03 |

Additional solid ionically conductive polymer materials are listing in Table 6 which were prepared using the synthesis method of Example 3, along with their reactants and associated ionic conductivity (EIS method).

TABLE 6

| Polymer (base) | Dopant | Ionic Compound | Ionic Conductivity S/cm |
|---|---|---|---|
| PPS | Chloranil | LiOH | 5.13E−03 |
| PPS | TCNE | LiOH | 3.06E−06 |
| LCP SRT802 | DDQ | LiOH | 2.16E−03 |
| LCP SRT900 | DDQ | LiOH | 2.42E−03 |
| LCP SRT901 | Chloranil | LiOH | 2.60E−03 |
| PPy | DDQ | LiOH | 1.39E−03 |
| PPy | Oxygen | LiOH | 6.06E−04 |
| PANI | DDQ | LiOH | 5.28E−04 |
| PANI | Oxygen | LiOH | 2.18E−05 |
| PVDF | DDQ | LiOH | 4.79E−04 |
| PVDF | Oxygen | LiOH | 3.65E−04 |
| PAN | DDQ | LiOH | 6.39E−04 |
| PAN | Oxygen | LiOH | 5.65E−04 |
| PTFE | DDQ | LiOH | 8.28E−04 |
| PTFE | Oxygen | LiOH | 9.13E−04 |
| PE | DDQ | LiOH | 1.70E−03 |
| PE | Oxygen | LiOH | 3.12E−04 |

The LCPs listed in the Table 6 were sourced from Solvay under the Xydar tradename, and are LCP grades with different melting temperatures.

Physical properties of the solid ionically conducting polymer material:

The physical properties of the solid ionically conductive polymer material can vary based on the reactants used. The specific ion mobility and anionic and cationic diffusing ions are derived from the material synthesis; however other physical properties appear to not be significantly altered relative the reactant polymer.

Example 9

Crystallinity
The reactants PPS, DDQ and LiOH from Example 3 was used to compare the relative physical properties of the reactant polymer and the synthesized solid ionically conductive polymer material.

Figure 3A:
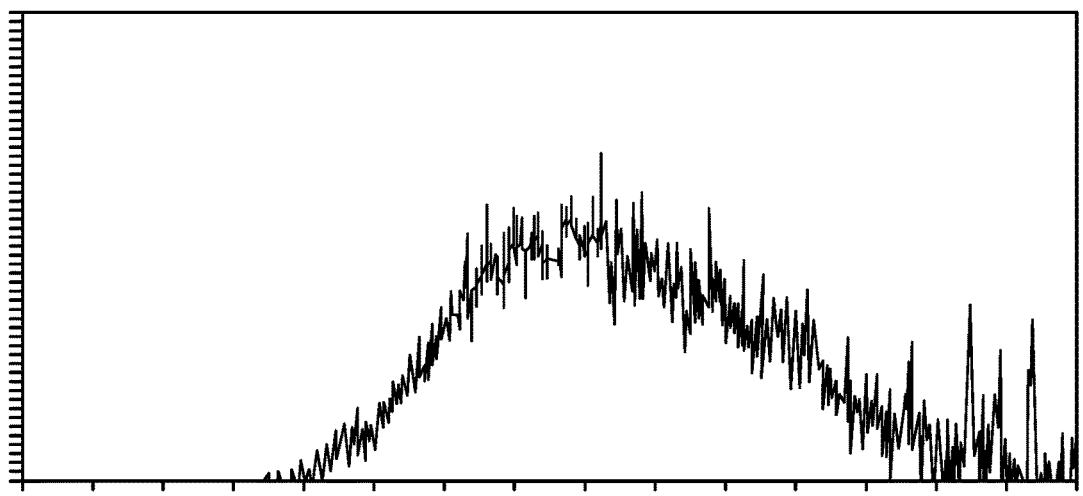
FIGS. 3A, 3B and 3C are x-ray diffraction plots described in Example 9.

In a first step, the PPS reactant and the LiOH monohydride were mixed and analyzed via x-ray diffraction ("XRD"). In FIG. 3A, the XRD of this amorphous polymer mixture shows peaks between 30 and 34 degrees that correspond to the LiOH monohydride. Otherwise that XRD shows that the polymer is amorphous and lacking any significant crystallinity.

Figure 3B:
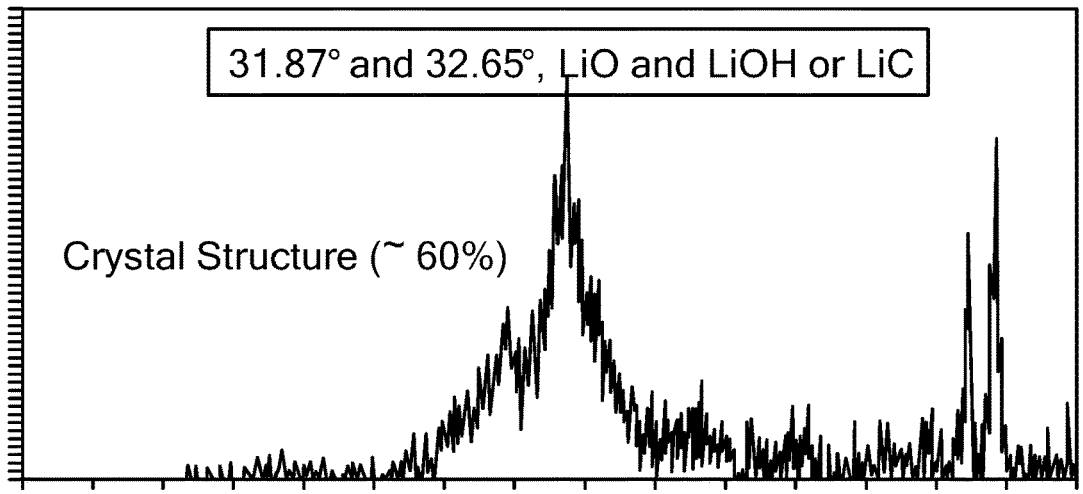

The mixture is extruded and drawn into a film. The heating of the PPS polymer via an extruder in this step anneals (heating and holding at an appropriate temperature below the melting point, followed by slow cooling) the amorphous PPS material while extruding the material into a film, thus creating or increasing crystallinity. In FIG. 3B, there is shown significant crystalline polymer peaks that also can be used to quantify the crystallinity of the PPS material at about 60%. The peaks of the LiOH monohydride remain.

Figure 3C:
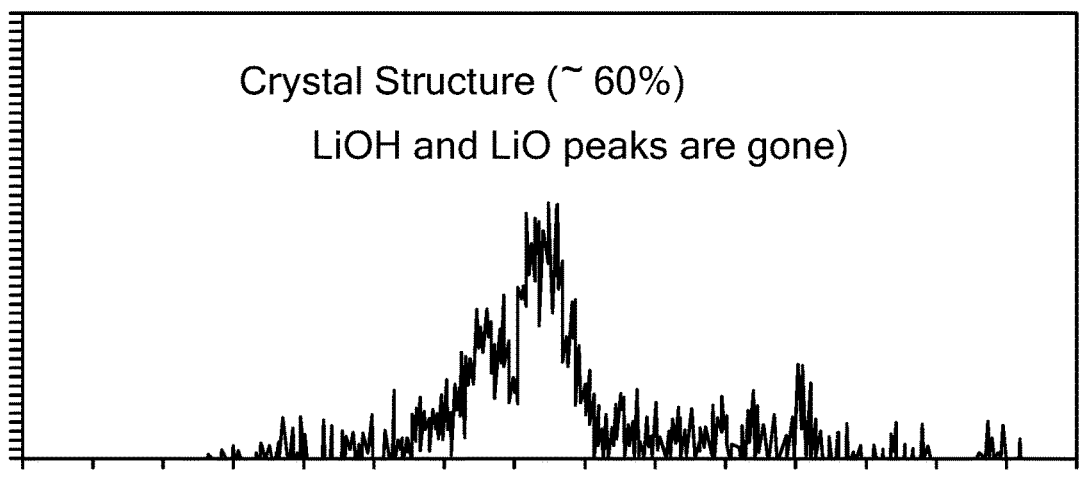

The film mixture is then vapor doped with the DDQ dopant to create the solid ionically conductive polymer material of the present invention and the corresponding XRD is shown in FIG. 3C. A color change is observed during doping as the material turns black after being doped. This color change indicates that the ionic charge transfer complexes are being formed, the polymer and dopant reactants have reacted in the presence of the ionic compound, and the material has been activated to become ionically conductive. The polymer peaks remain and indicate that the degree of crystallinity of the material remains at about 60% and therefore unchanged. However, the LiOH monohydride peaks have disappeared and are not replaced by any other peaks. The conclusion drawn is that the ionic compound has disassociated into its component cation and anions and these ions are now part of the material structure.

Glass Transition and Melting Point Temperature

Example 10

Although there are many techniques for determination of the melting temperature and Tg in a bulk or thin film polymer sample, differential scanning calorimetry ("DSC" and described in ASTM D7426 (2013)) provides a rapid test method for determining changes in specific heat capacity in a polymer material. The glass transition temperature is manifested as a step change in specific heat capacity.

Figure 4:
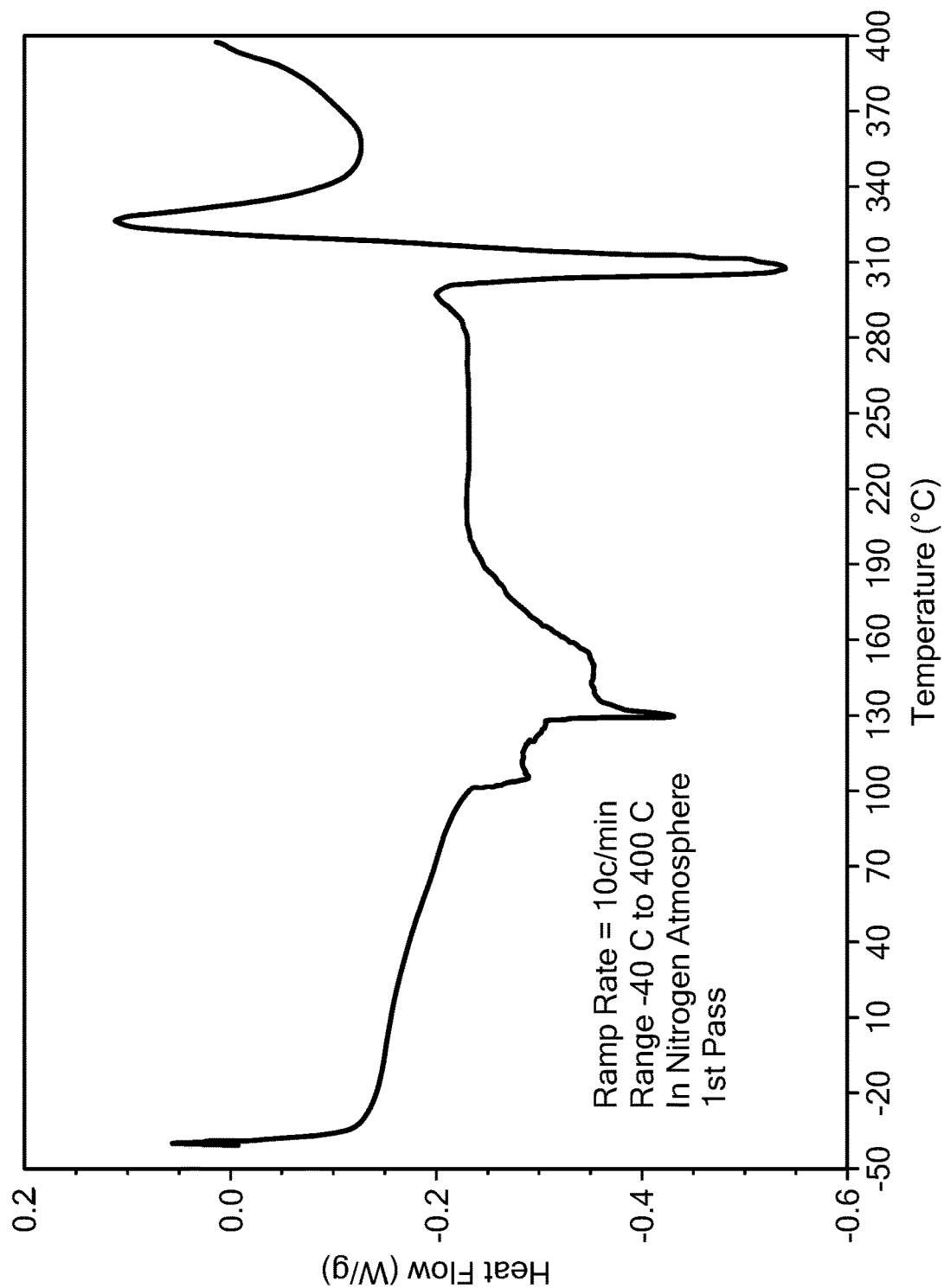
FIG. 4 is a DSC plot described in Example 10.

Referring to FIG. 4, there is shown a DSC plot for the synthesized material from Example 1. The melting point of the material [PPS-Chloranil-LiTFSI] are derived via DSC and determined to not be different from the reactant polymer PPS: Tm around 300 C. The base polymer glass transition temperature Tg is between 80-100 C, however, in the DSC plot no Tg inflection appears and it is believed that upon synthesis, the solid ionically conductive polymer material loses its viscoelastic state which was evident in the PPS base polymer and the glassy state extends below the temperature range below the material melting temperature. It is believed that the dip in the plot at 130 C is an artifact of the ionic compound.

Ionic Conductivity

Ionic conductivity of the solid ionically conductive polymer material of the present invention are measured and compared relative conventional electrolytes. The material of the present invention was found to be ionically conductive at ambient conditions while in the glassy state, whereas the reactant polymer was ionically insulative. As the material is in the glassy state, there cannot be any associated segmental motion, therefore the diffusion of the lithium cation and the anion must be enabled via a different ion conduction mechanism in which segmental motion is not required.

Specifically, films of the solid, ionically conducting polymer materials of the present invention as described in Example 1 are extruded in thickness ranging upwards from 0.0003 inches (7.6 micrometers). The ionic surface conductivity of the films is measured using a standard test of AC-Electrochemical Impedance Spectroscopy (EIS) known to those of ordinary skill in the art. Samples of the solid, ionically conducting polymer material film are sandwiched between stainless steel blocking electrodes and placed in a test fixture. AC-impedance was recorded in the range from 800 KHz to 100 Hz using a Bio-Logic VSP test system to determine the material ionic conductivity. In-plane and through plane ionic conductivity was measured by using the Bio-Logic by placing the material film in an appropriate jig. Through plane conductivity was measured at $3.1 \times 10^{-4}$ S/cm, and in-plane conductivity was measured at $3.5 \times 10^{-4}$ S/cm. These measurements were similar enough to consider the material isotropic relative ionic conductivity.

Material from Example 1 was used to make a film of about 150 micrometers in thickness. Electronic conductivity was directly measured via a potentiostatic experiment. The film was placed between two stainless steel blocking electrodes, and a 0.25 V voltage was held across the electrodes. Current was measured at 180 nanoAmps yielding an electrical conductivity of $2.3 \times 10^6$ ohm-cm$^2$ at room temperature. This electrical conductivity (area specific resistance) is low and below $1.0 \times 10^5$ ohm-cm$^2$ at room temperature which is sufficient for an electrolyte.

Thermogravimetric analysis of the material from Example 1 was conducted to determine the water content of the material. After storage of the material in a dry atmosphere glove box, the thermogravimetric analysis was conducted and showed the material contains <5 ppm water. Certain salts (e.g. LiOH as an ionic compound) used as reactants for the solid ionically conductive polymer material attract atmospheric water and thus can render the material hydrophilic.

Example 12

The modulus of the synthesized material of Example 3 was tested. The range of Young's modulus for the electrolyte made from this specific solid polymer material is 3.3-4.0 GPa. However the range of Young's modulus for the materials listed in this application is much larger and spans from 3.0 MPa to 4 GPa. The synthesized material remains a thermoplastic, and can be reformed using plastic processing techniques. The material of Example 3 was heated in excess of its melting point and then allowed to cool. The material was then reformed into a film. Thus the material is shown to both have a high modulus and to be thermoplastic.

Comparative Example 13

Figure 5:
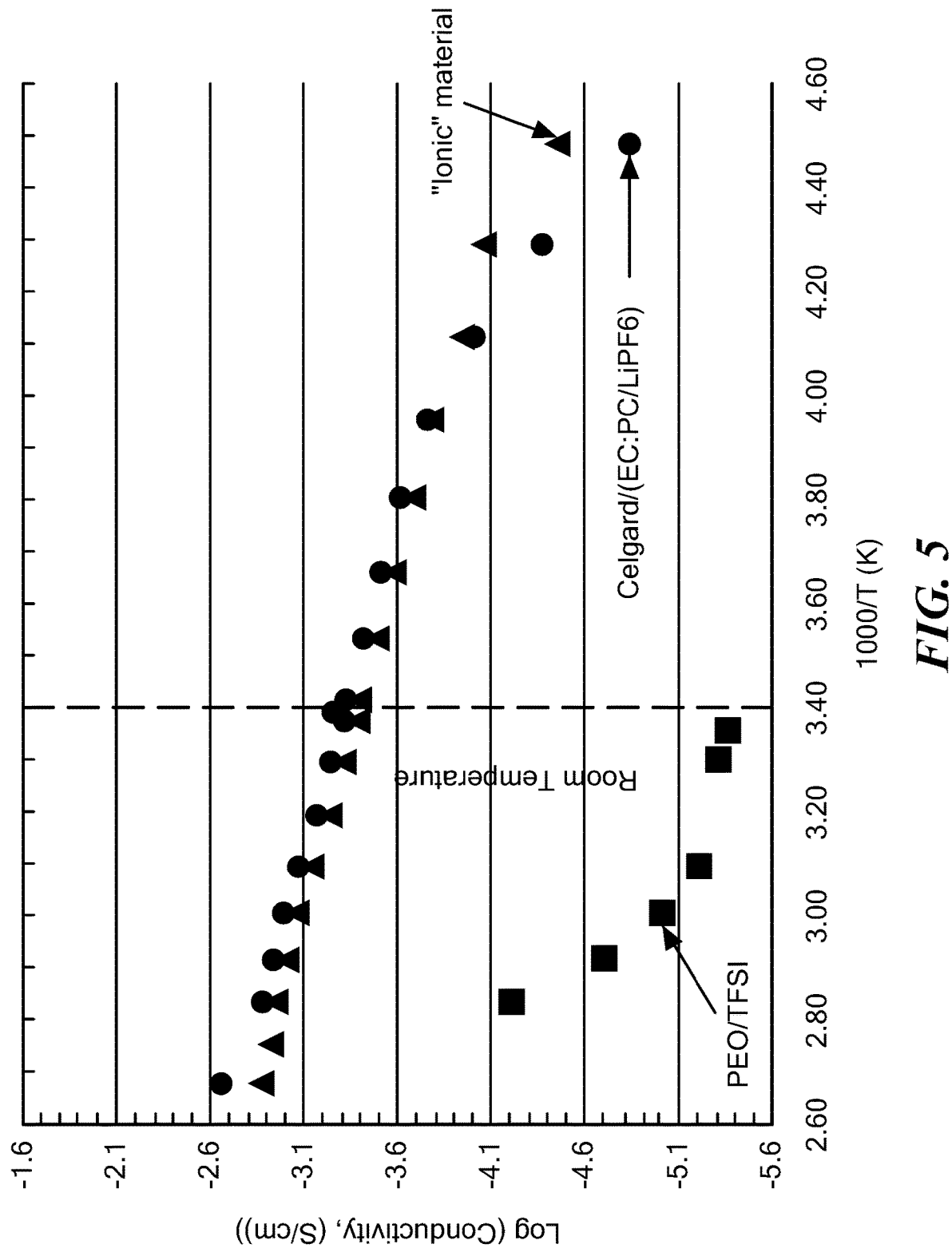
FIG. 5 is a plot of the measured conductivity relative temperature as described in Comparative Example 13.
Figure 6:
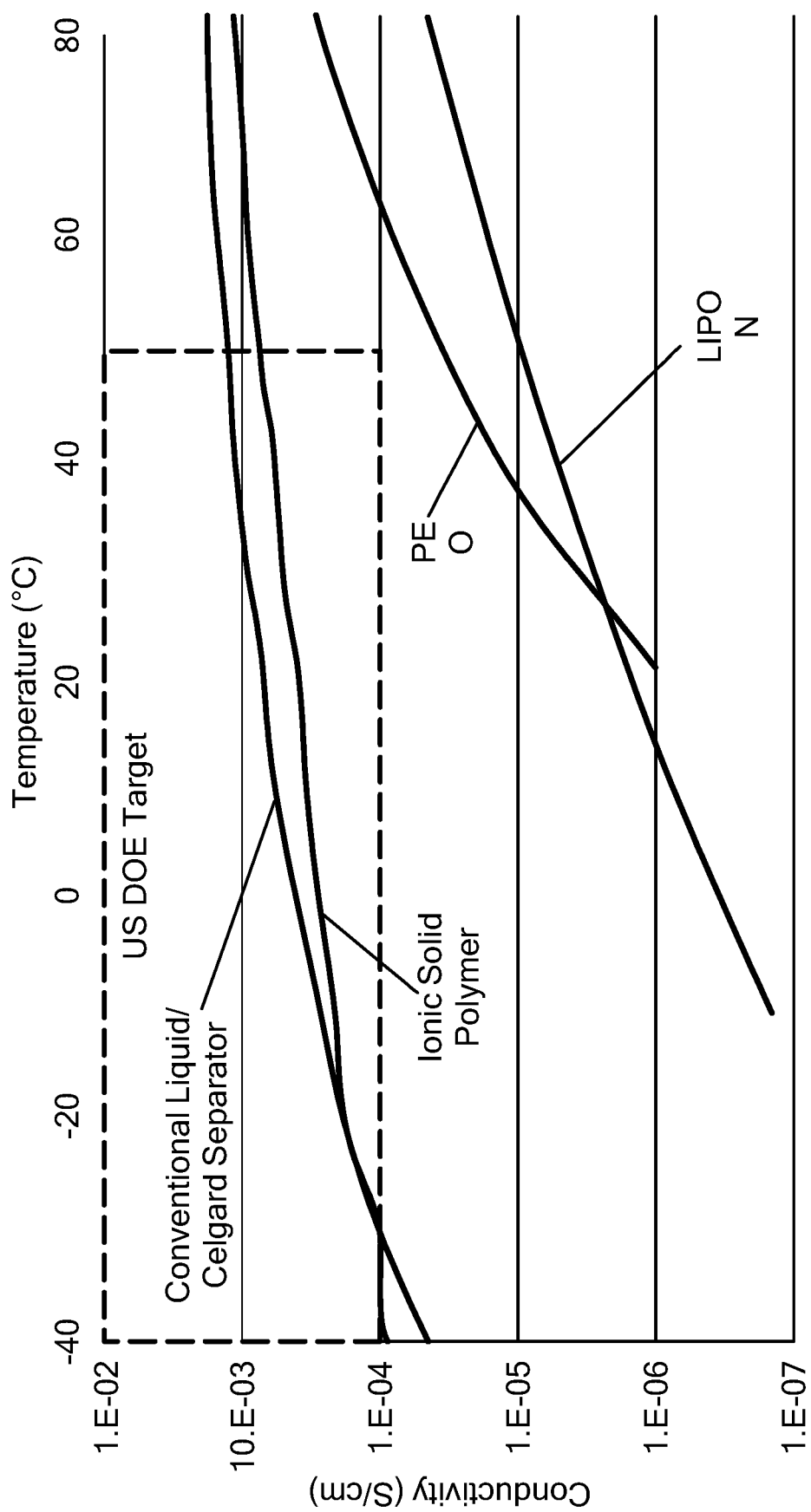
FIG. 6 is a plot of the measured conductivity relative temperature as described in Comparative Example 13.

The results of the ionic conductivity measurements as reported in Example 1 are illustrated in FIGS. 5 and 6. The conductivity of solid, ionically conductive polymer material film according to the invention (A) is compared with that of trifluoromethane sulfonate PEO (Q) and a liquid electrolyte made up of a Li salt solute and an ethylene carbonate—propylene carbonate "EC:PC" combination solvent using a Celgard separator (O).

Referring to FIG. 5, the measured conductivity of the solid polymer ionically conductive material as a function of temperature is displayed. Also show are measured ionic conductivity of both a liquid electrolyte EC:PC with LiPF6 salt with a Celgard separator, and a PEO-LiTFSI electrolyte. The conductivity of the solid ionically conductive polymer material at room temperature is about 2.5 orders of magnitude higher compared to PEO-LiTFSI electrolytes and comparable to the conductivity of a conventional liquid electrolyte/separator system measured in similar conditions. The temperature dependence of the conductivity for the solid ionically conductive polymer material does not display a sharp increase above its glass transition temperature, associated with chain mobility, as described by Vogel-Tamman-Fulcher behavior activated by temperature. Therefore, segmental movement as the ion-conduction mechanism in the polymer electrolyte material is not occurring as the material displays significant ionic conductivity while in its glassy state. Furthermore, this demonstrates that the inventive polymer material has a similar level of ionic conductivity relative to liquid electrolytes.

In FIG. 6, the ionic conductivity of the solid ionically conductive polymer material is compared to both the conventional liquid electrolyte, comparative example lithium phosphorous oxynitride "LIPON" and relative DOE targets for conductivity and temperature. Referring to FIG. 5B, the ionic conductivity of the solid ionically conductive polymer material is greater than $1 \times 10^{-04}$ S/cm at room temperature (about 21° C.), about $1 \times 10^{-04}$ S/cm at about −30° C. (and greater than $1 \times 10^{-05}$ S/cm, and greater than $1 \times 10^{-03}$ S/cm at about 80° C.

Example 14

Figure 7:
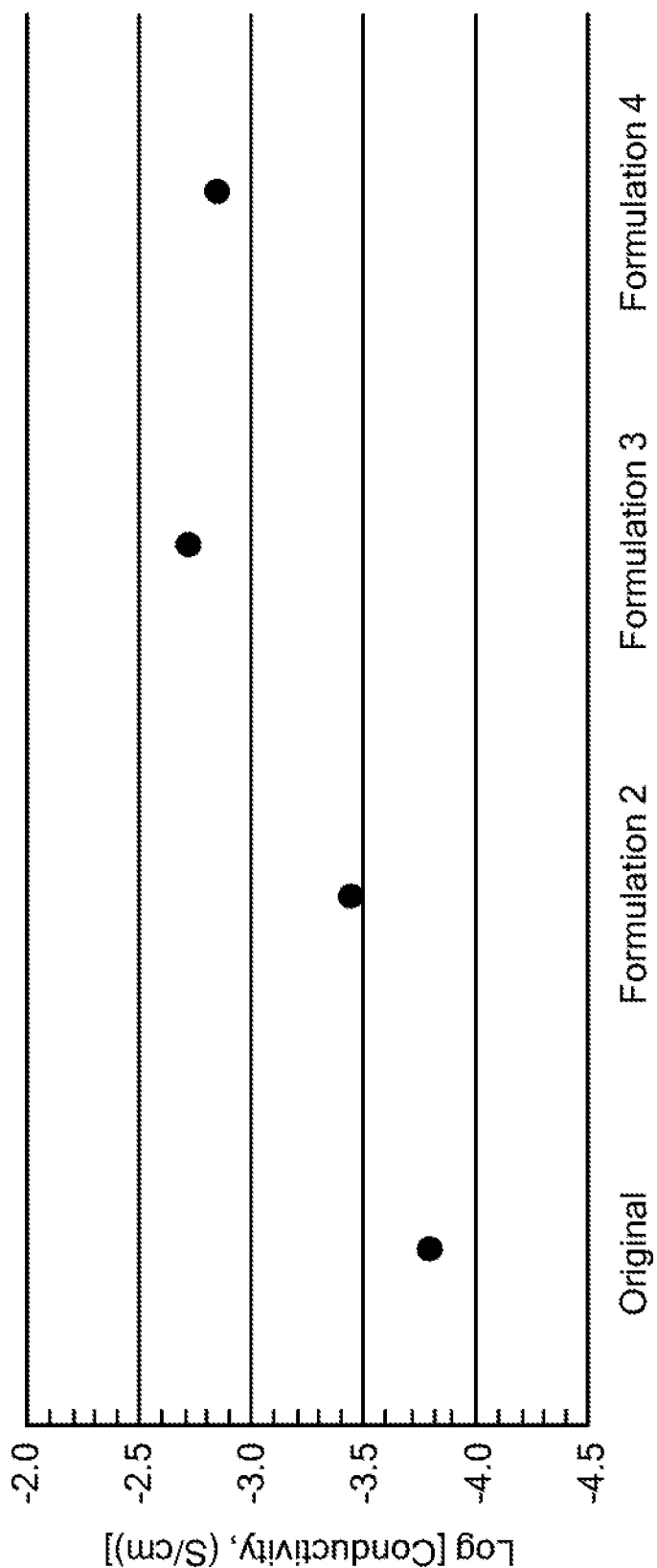
FIG. 7 is a plot of the measured conductivity for samples of the material described in Example 14.

The ionic conductivity can be optimized by adjustments to the material formulation. FIG. 7 shows improvements and optimization of ionic conductivity that have resulted from adjustments to the polymer material formulation e.g. changes in base polymer, dopant or ionic compound.

Diffusivity

In addition to ionic conductivity, diffusivity is an important intrinsic quality of any electrolyte and ionically conductive material.

Example 15

Diffusivity measurements were conducted on the material created in Example 3.

Fundamental NMR techniques was used to unambiguously identify Li+ as a free flowing ion in the solid ionically conductive polymer material. NMR is element specific (e.g, H, Li, C, F, P, and Co) and sensitive to small changes in local structure.

Specifically, the diffusivity of lithium and hydroxyl ions was evaluated by a pulsed gradient spin echo ("PGSE") lithium NMR method. The PGSE-NMR measurements were made using a Varian-S Direct Drive 300 (7.1 T) spectrometer. Magic angle spinning technique was used to average out chemical shift anisotropy and dipolar interaction. Pulsed gradient spin stimulated echo pulse sequence was used for the self-diffusion (diffusivity) measurements. The measurements of the self-diffusion coefficients for the cation and anion in each material sample were made using $^1$H and $^7$Li nuclei, respectively. The NMR-determined self-diffusion coefficient is a measure of random thermally induced translational motion akin to Brownian motion, where there is no external directional driving force. However self-diffusion is closely related to ionic mobility and ionic conductivity via the Nerst Einstein equation and hence is an important parameter to measure when characterizing battery electrolytes. When one has both ionic conductivity and diffusion data, it is possible to ascertain the presence of ion pairing or higher aggregation effects that limit the performance of the electrolyte. These tests concluded that the solid polymer ionically conductive material, has a $Li^+$ diffusivity of $5.7 \times 10^{-11}$ m$^2$/s at room temperature, making it higher than PEO/LiTFSI at 90° C. and at least an order of magnitude higher than $Li_{10}GeP_2S_{12}$ (measured at high temperatures). The solid ionically conductive polymer material can thus act as a new solid electrolyte with the unique ability to conduct multiple ions, which can diffuse and be mobile and to provide sufficiently high ionic conductivity for batteries and other applications at room temperature.

The diffusivity of the OH ion was $4.1 \times 10^{-11}$ m$^2$/s at room temperature. Thus, the solid ionically conductive polymer material has a very high diffusion rate for a solid OH$^-$ conductor. The corresponding cation transference number (defined in equation (1) below), is 0.58, which is also significantly high and different from prior art solid electrolytes.

Example 16

Diffusivity measurements were conducted on the material created in Example 1 [PPS-DDQ-LiTFSI]. Self-diffusion was measured using the technique set forward in Example 15. The material cation diffusivity D ($^7$Li) of $0.23 \times 10^{-9}$ m$^2$/s at room temperature, and the anion diffusivity D ($^1$H) of was $0.45 \times 10^{-9}$ m$^2$/s at room temperature.

In order to determine the degree of ion association which would decrease the conductivity of the material, the conductivity of the material is calculated via the Nernst-Einstein equation, using the measured diffusion measurements, it was determined the associated calculated conductivity to be much greater than the measured conductivity. The difference was on average at least an order of magnitude (or 10×). Therefore, it is believed that conductivity can be improved by improving ion dissociation, and the calculated conductivities can be considered within the range of conductivity.

The cation transference number can be estimated via equation (1) from the diffusion coefficient data as:

$$t+ \sim D+/(D++D-) \qquad (1)$$

where D+ and D− refer to the diffusion coefficients of the Li cation and TFSI anion, respectively. From the above data, one obtains a t+ value of about 0.7 in the solid ionically conductive polymer material as compared t+ of about 0.2 in the corresponding PEO electrolyte (liquid carbonate electrolytes also have t+ values of about 0.2). This property of high cation transference number has important implications to battery performance. Ideally one would prefer a t+ value of 1.0, meaning that the Li ions carry all the electric current. Anion mobility results in electrode polarization effects which can limit battery performance. In materials where both ions can be mobile, t+ values of 0.5 or greater are highly sought though very rarely achieved. The calculated transference number of 0.7 is not believed to have been observed in any liquid or PEO based electrolyte. Although ion association may affect the calculation, electrochemical results confirm the transference number range of between 0.65 and 0.75.

It is believed that the t+ is dependent on anion diffusion as lithium cation diffusion is high. As the cation diffusion is greater than the corresponding anion diffusion the cation transference number is always above 0.5, and as the anion is mobile the cation transference number must also be less than 1.0. It is believed that a survey of lithium salts as ionic compounds would produce this range of cation transference numbers greater than 0.5 and less than 1.0. As a comparative example, some ceramics have been reported to have high diffusion numbers, however such ceramics only transport a single ion, therefore the cation transference number reduces to 1.0 as the D− is zero.

Although the transference numbers are being calculated from NMR derived diffusivity measurements, alternative means of calculating transference can be achieved by direct methods such as the Bruce and Vincent method. The Bruce and Vincent methods was used to calculate the transference number of the solid ionically conductive polymer material and good correlation was found relative the NMR derived measurement.

Figure 8:
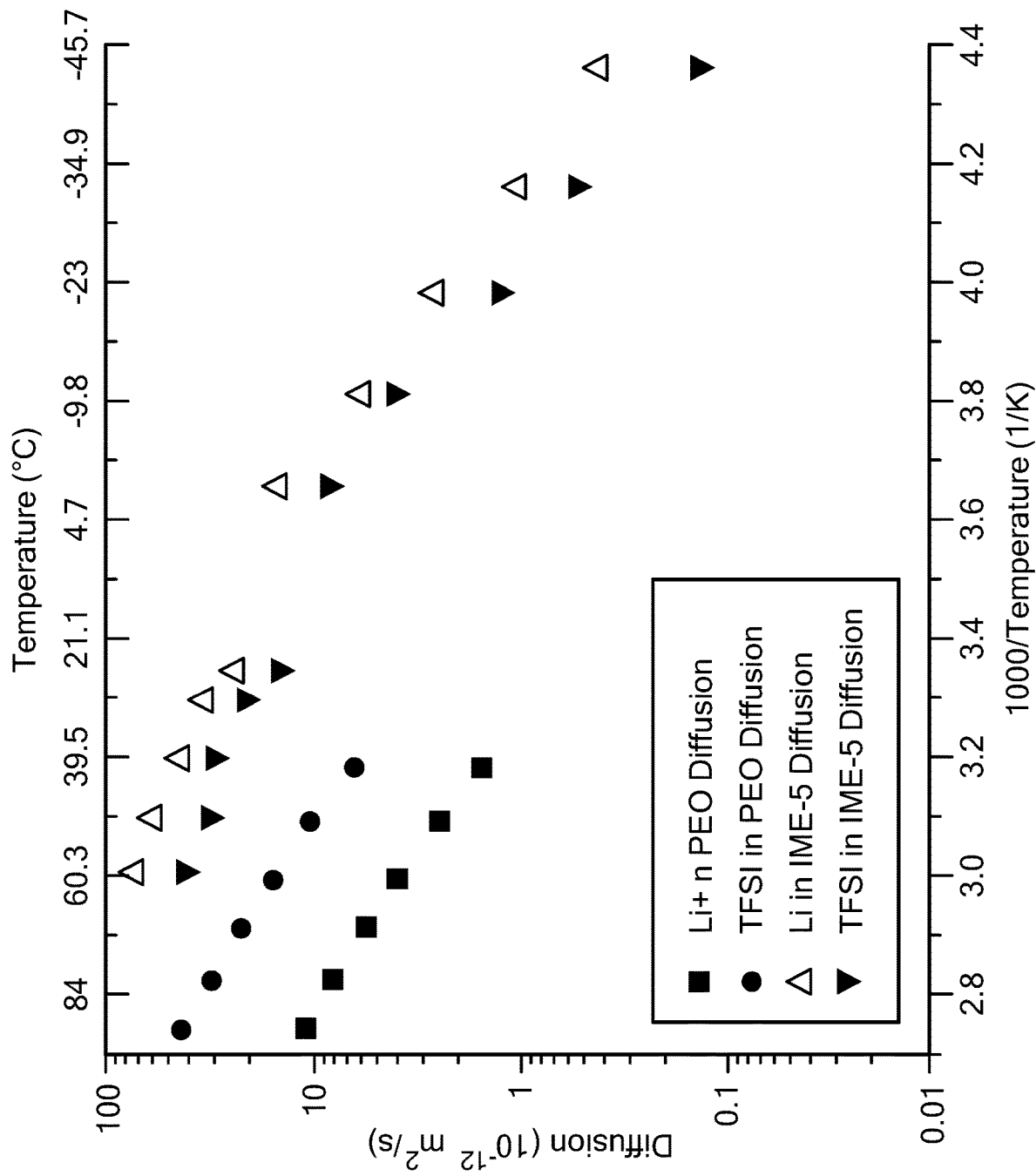
FIG. 8 is a plot of the measured diffusivity relative temperature for samples of the material described in Example 16.

Referring to FIG. 8 show a result of diffusion measurements the solid ionically conductive polymer material over a large temperature range, and compared to PEO containing LiTFSI as the ion source. The most important conclusions are: (i) at temperatures where both compounds can be measured, the Li diffusion is nearly two orders of magnitude higher in the solid polymer ionically conductive material than in the PEO LiTFSI polymer electrolyte; (ii) the diffusion coefficients in solid polymer ionically conductive material are measureable down to at least −45° C., a very low temperature for Li diffusion to be measured in any solid material—specifically the lithium ion diffusivity is greater than $1 \times 10^{-13}$ m$^2$/s. This superior ionic conductivity performance of the solid ionically conductive polymer material at low temperatures surpasses that of typical liquid battery electrolytes. It is also noteworthy that the NMR spectra temperature dependence suggests that ion motion is decoupled from the polymer in that it does not rely on polymer segmental motion and instead enables significant ionic diffusion in its glassy state. Thus there is demonstrated a solid, ionically conductive, polymer material having a crystallinity greater than 30%; a glassy state; and both at least one cationic and anionic diffusing ion, wherein at least one (in this aspect both diffusing ions) diffusing ion is mobile in the glassy state.

Comparative Example 17

Figure 9:
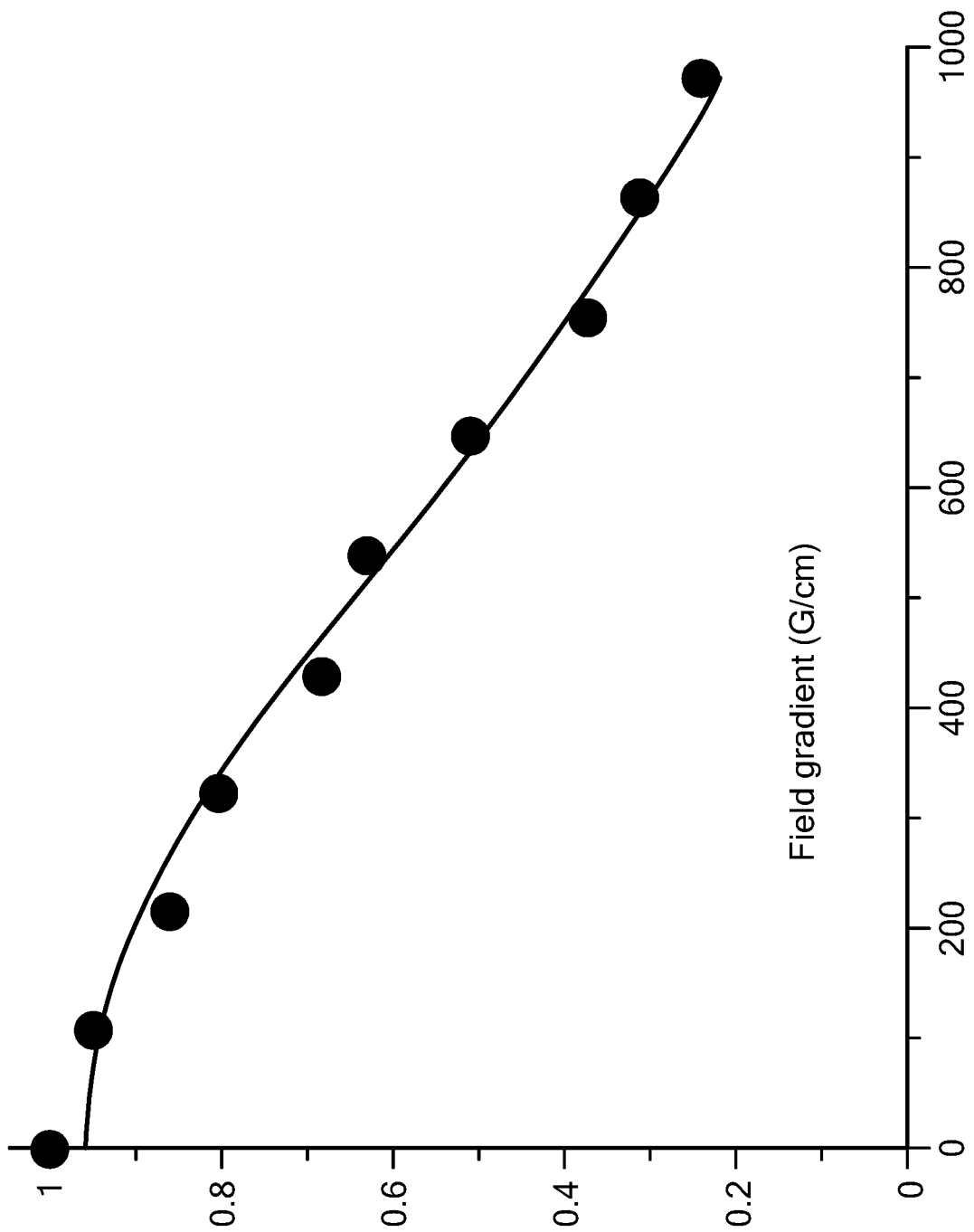
FIG. 9 is a NMR diffusivity plot for a comparative material described in Example 17.

The cation diffusivity of LiPON is taken from "Structural Characterization and Li dynamics in new $Li_3PS_4$ ceramic ion conductor by solid-state and pulsed-field gradient NMR", Mallory Govet, Steve Greenbaum, Chengdu Liang and Gayari Saju, Chemistry of Metals (2014). An experimental method is used similar to that set forward in Example 15 and 16, and a diffusivity curve is set forward in FIG. 9. It was determined LiPON has a cation diffusivity D ($^7$Li) of $0.54 \times 10^{-12}$ m$^2$/s at 100° C. This diffusivity is about eighty times smaller than the diffusivity of the material of the present invention at ambient temperature (21° C.).

Chemical Structure of the Material

Experiments are conducted to determine information about the chemical structure of the solid ionically conducting polymer material.

Example 18

In this Example, the material synthesized in Example 3 is studied along with its reactant components PPS and DDQ and LiOH monohydride.

Figure 10:
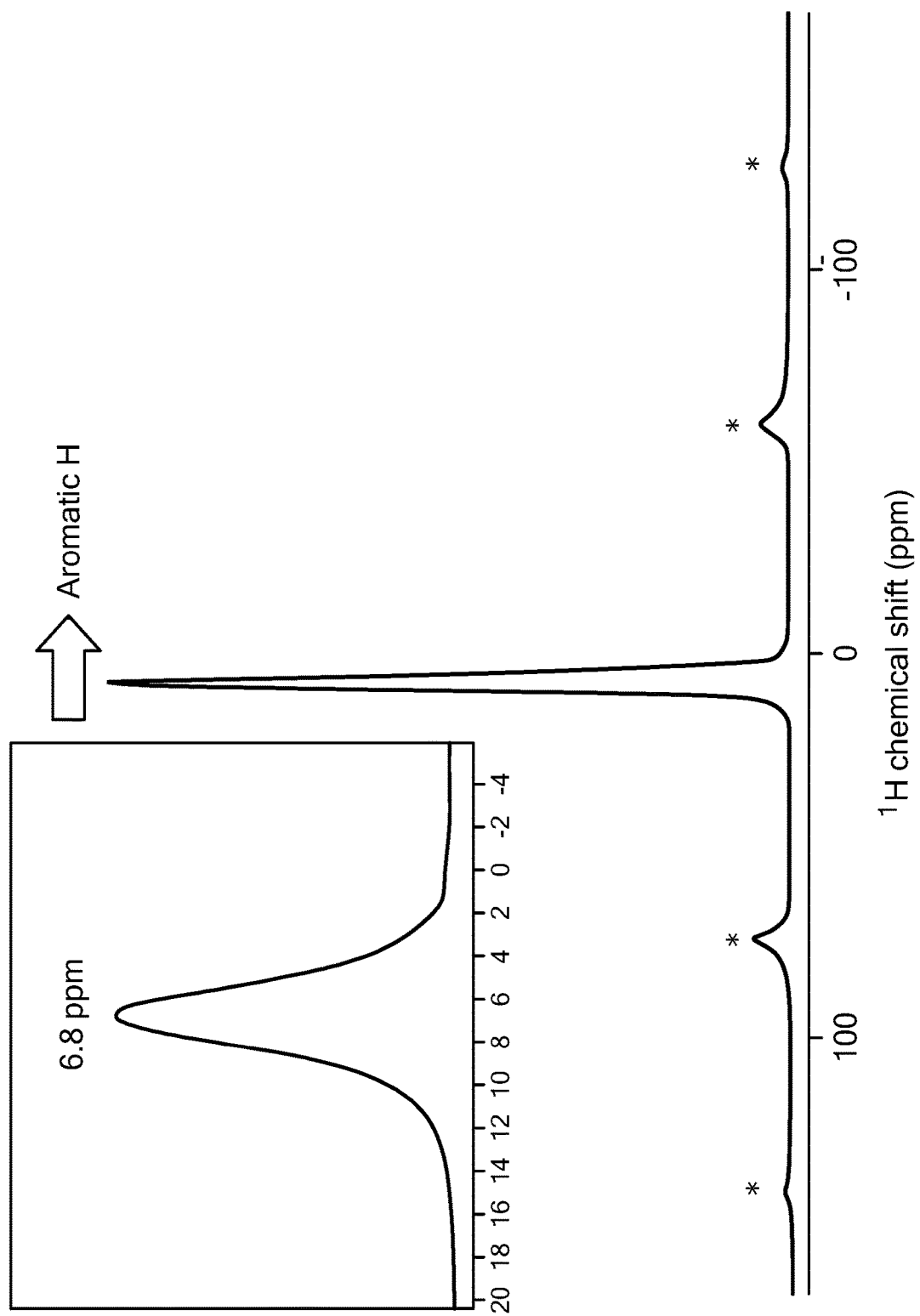
FIG. 10 is a NMR spectra of base polymer reactant described in Example 18.

The reactant or base polymer PPS is first analyzed and referring to FIG. 10 a proton ($^1$H) NMR spectrum of PPS is characterized by a single peak centered at 6.8 ppm, relative to a tetramethylsilane ("TMS") spectroscopic standard. This is a clear indication of aromatic hydrogen, as expected from the structure of the polymer. The proton solid state MAS NMR spectrum of PPS polymer was taken on a 300 MHz instrument. Asterisks denote spinning sidebands, and the inset shows expanded resolution.

Figure 11:
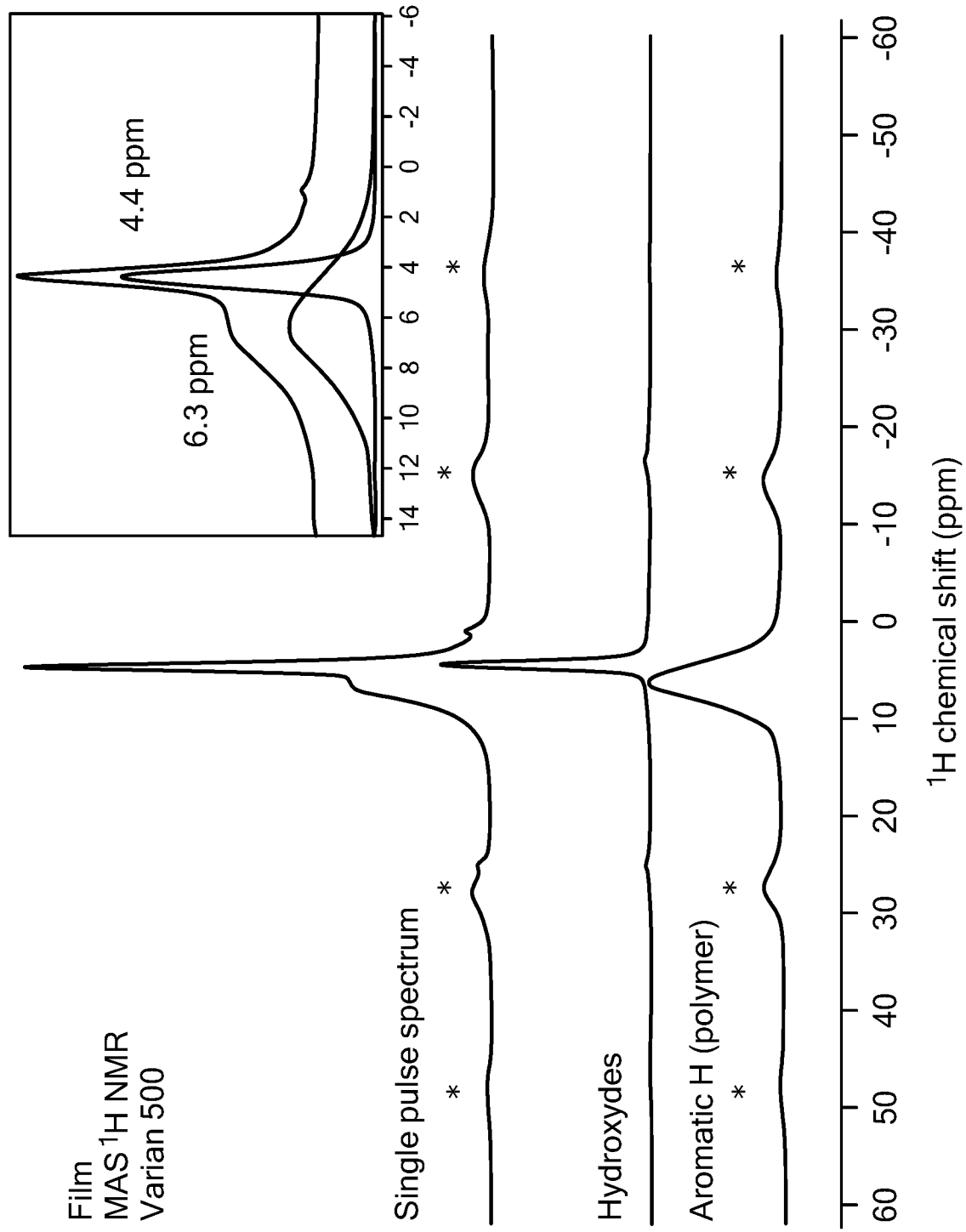
FIG. 11 is a NMR spectra of the material described in Example 18.

Referring to FIG. 11, the $^1$H NMR spectrum of the solid ionically conductive polymer material (top), with spectral deconvolution into OH-type protons (middle) and aromatic protons (bottom). The spectrum confirms aromatic hydrogen and hydroxides. The proton solid state MAS NMR spectrum of material is taken on a 500 MHz instrument. Asterisks denote spinning sidebands, inset shows expanded resolution. Spectral deconvolution into OH and base polymer protons is shown in the inset as additional experimental spectrum. Because NMR spectroscopy is quantitative (as long as care was taken not to saturate the signal), direct integration of the spectral peaks gives the proportion of nuclei in a particular phase. The results of this integration shows that the material possesses greater than one mobile OH ion per repeat group aromatic and contains about two LiOH molecules per polymer repeat unit (monomer), which is a very high ion concentration. The narrow OH signal shows high mobility of the OH ion.

Figure 12:
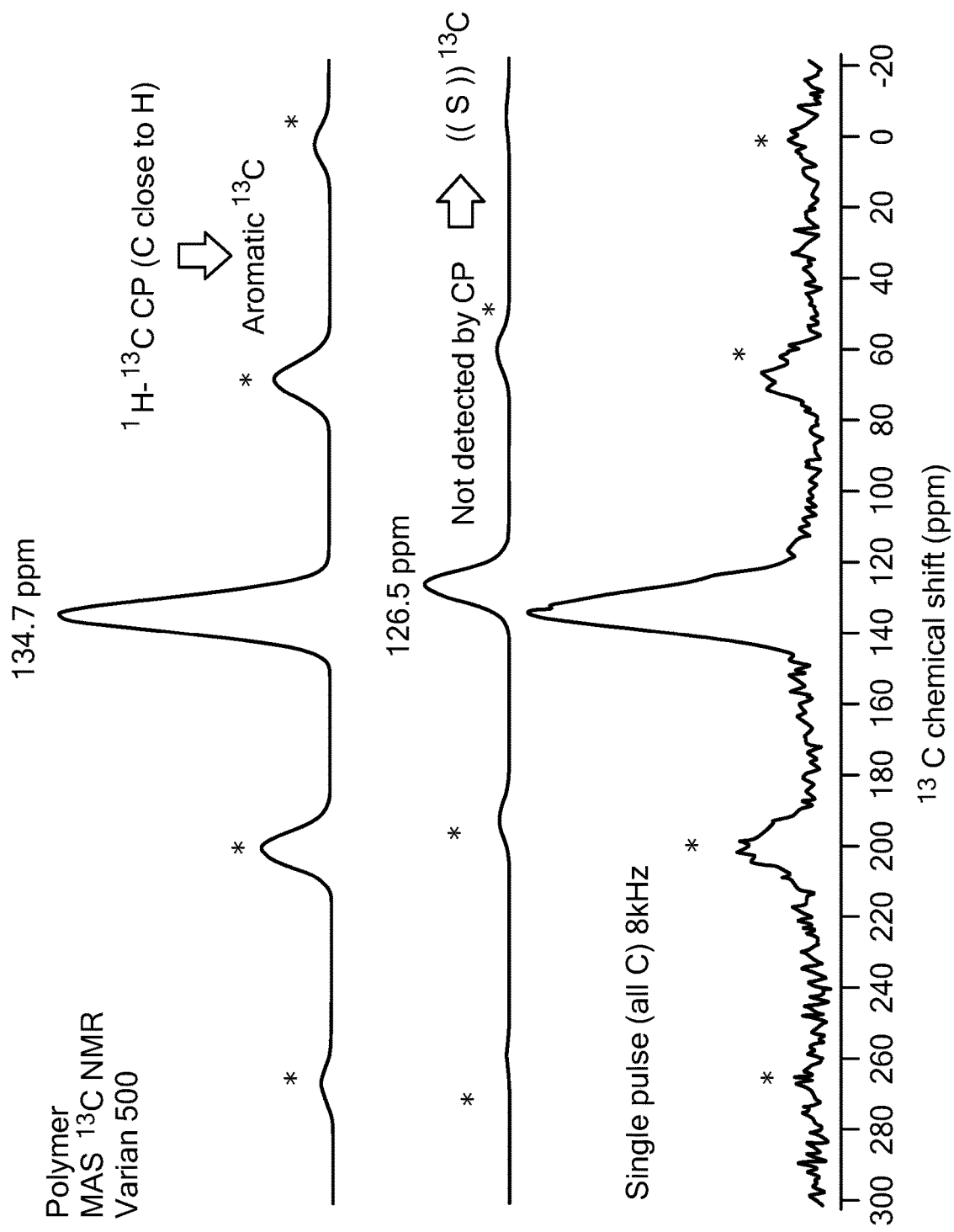
FIG. 12 is a NMR spectra of the material described in Example 18.

Additional structural information can be obtained by Carbon-13 solid state MAS NMR, which is enabled by the ~1% natural abundance of $^{13}$C. Cross polarization (CP) is utilized, whereby nearby protons are resonated simultaneously with the $^{13}$C nuclei in such a way as to transfer nuclear magnetization onto the "rare" spins to enhance detection sensitivity. In FIG. 12, the PPS polymer spectrum is depicted under both direct polarization, where all the carbons participate in the signal (bottom) and CP (top), where only those directly bonded to hydrogen participate. The difference spectrum (middle) thus corresponds to carbon bonded to sulfur.

Figure 13:
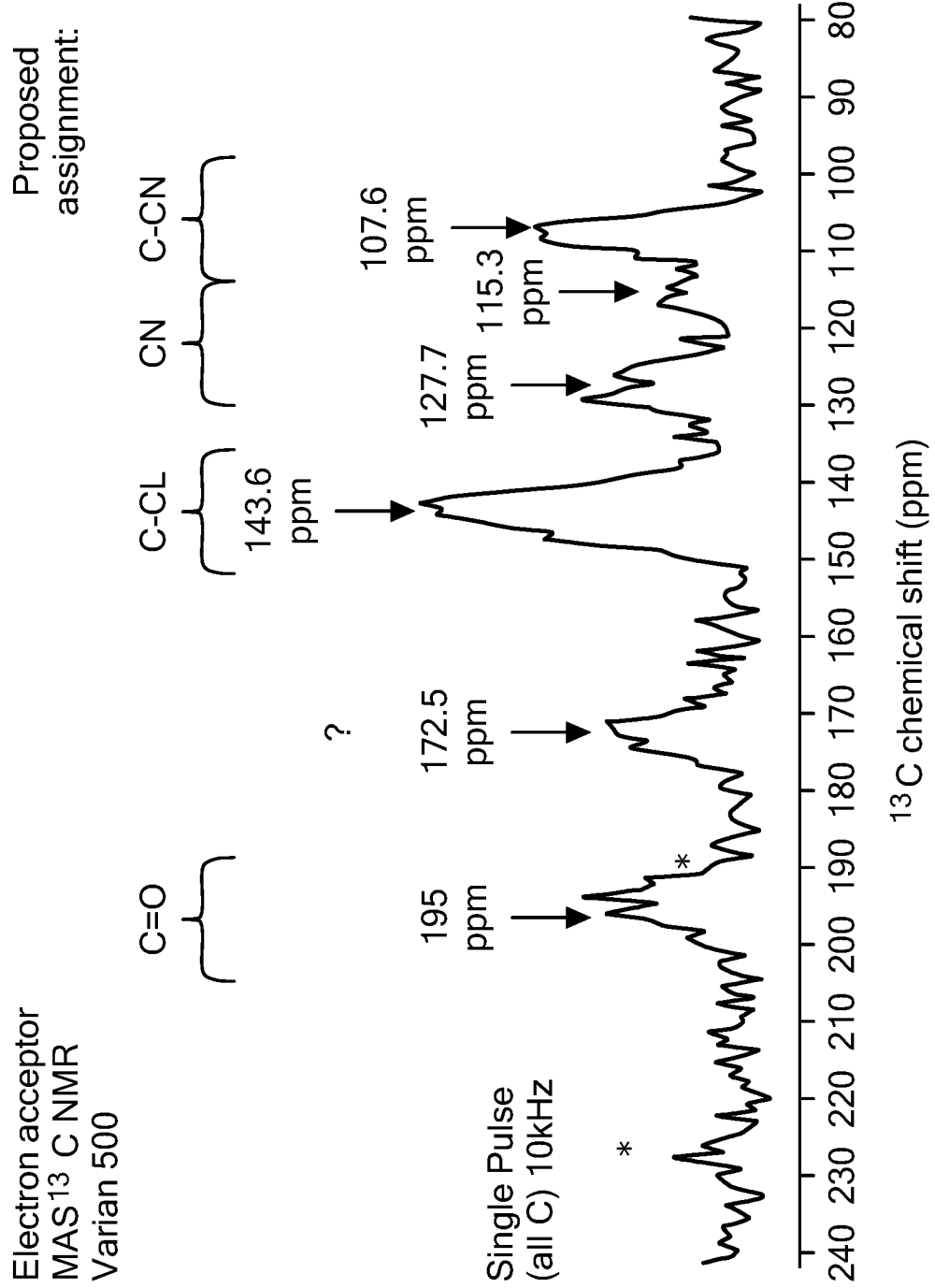
FIG. 13 is a NMR spectra of the electron acceptor described in Example 18.

Referring to FIG. 13 which displays the $^{13}$C spectrum MAS NMR spectrum of electron acceptor compound taken on a 500 MHz instrument by direct polarization, with proposed spectral assignments of the electron acceptor DDQ. Because there is no hydrogen in this molecule, the spectrum was acquired under direct detection. Because of very long spin-lattice relaxation times (likely in excess of 1 minute), the signal to noise ratio is rather low. Assignments for the various peaks are indicated in FIG. 13. The appearance of six distinct peaks as opposed to the expected four (corresponding to four chemically inequivalent carbons) suggests the possible presence of isomers.

Figure 14A:
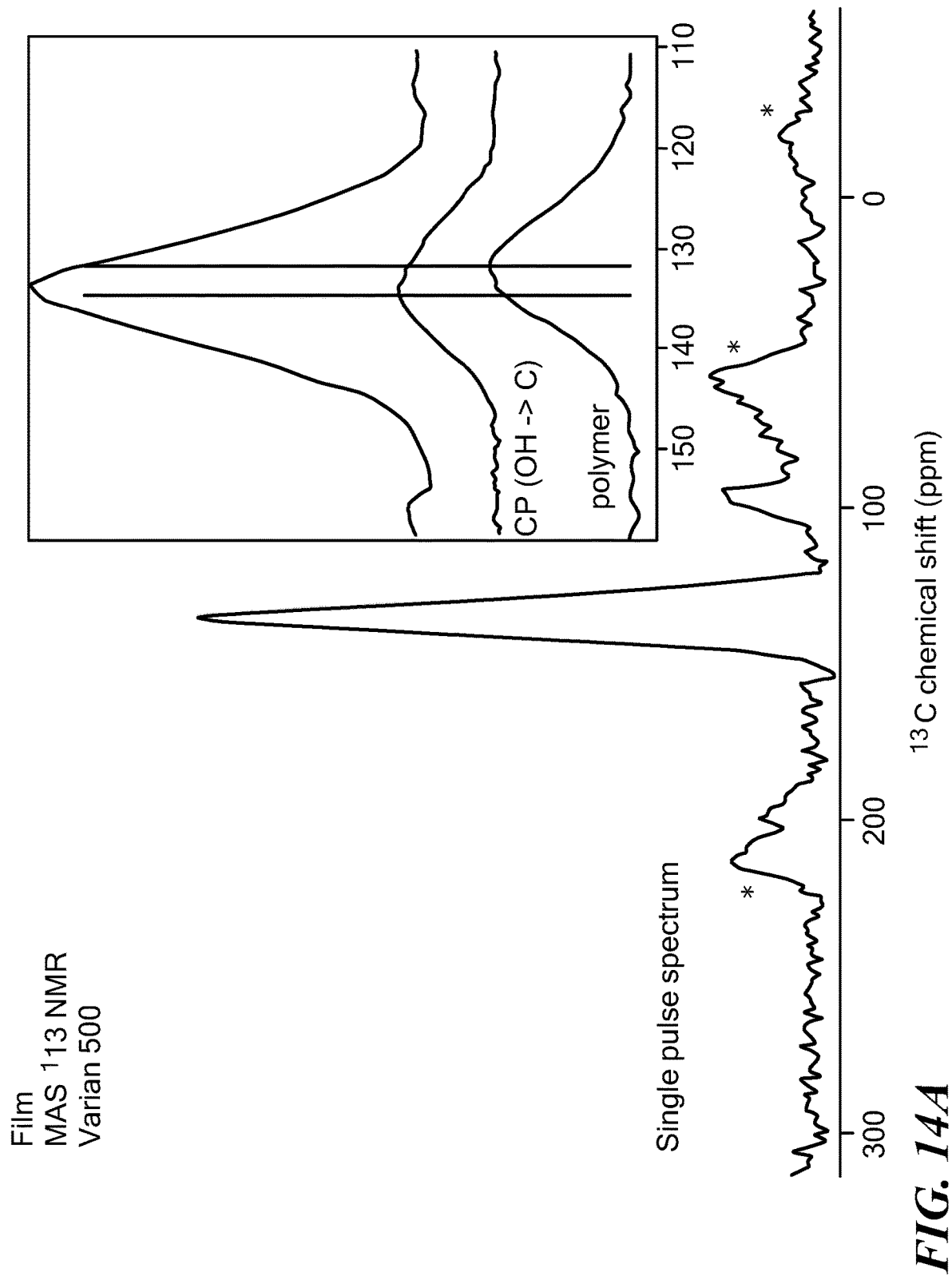
FIG. 14A is a NMR spectra of the material described in Example 18.
Figure 14B:
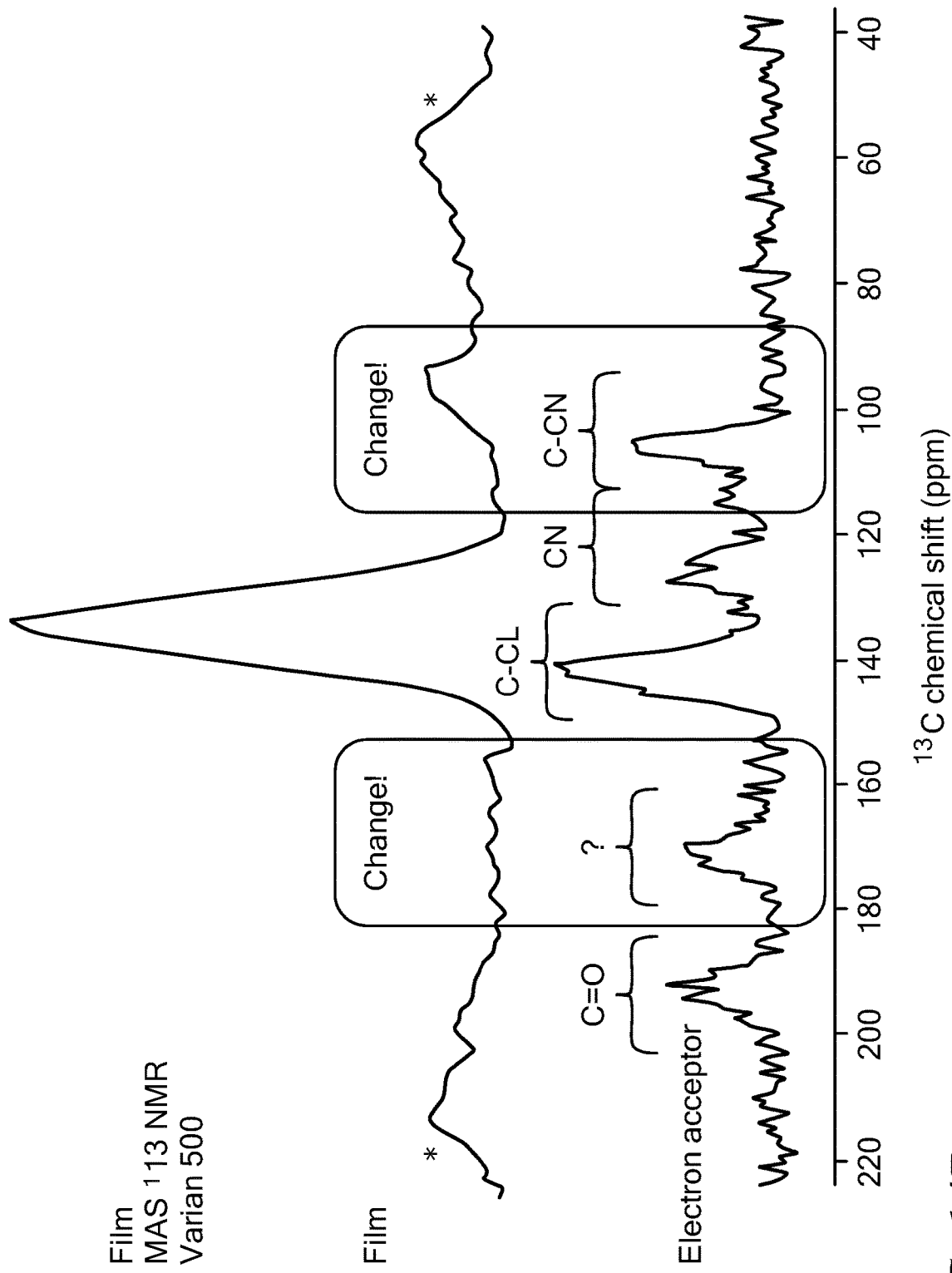
FIG. 14B is a NMR spectra of the material described in Example 18.

The $^{13}$C solid state MAS NMR spectrum of the solid ionically conducting polymer material taken on a 500 MHz instrument by direct polarization is shown in FIG. 14A, indicating a shift in the main peak (dominated by the aromatic carbon) in going from the PPS to the ionically conducting material. The CP spectrum in the middle of the inset suggests that the PPS polymer is strongly interacting with the OH groups of the LiOH. Expanded scale spectra of both the material and DDQ electron acceptor are compared in FIG. 14B, showing that there has been a chemical reaction in the material that obscures the original spectral signatures of the reactants.

This NMR analysis clearly shows that the three distinct reactants have reacted to form the solid ionically conductive polymer material of the present invention. A new material has been formed, which is not merely a mixture of its constituents. There is a reaction between the three components and the solid polymer ionically conductive material is the reaction product. In particular, there is a shift in the $^{13}$C NMR peak between the base polymer and the synthesized material. Furthermore, the effect of simultaneous irradiation of the $^1$H resonance of the hydrogen associated with OH and $^{13}$C resonance shows that the ions have been incorporated into the structure, so all three distinct components have reacted and are part of the new synthesized material.

Example 19

Figure 15:
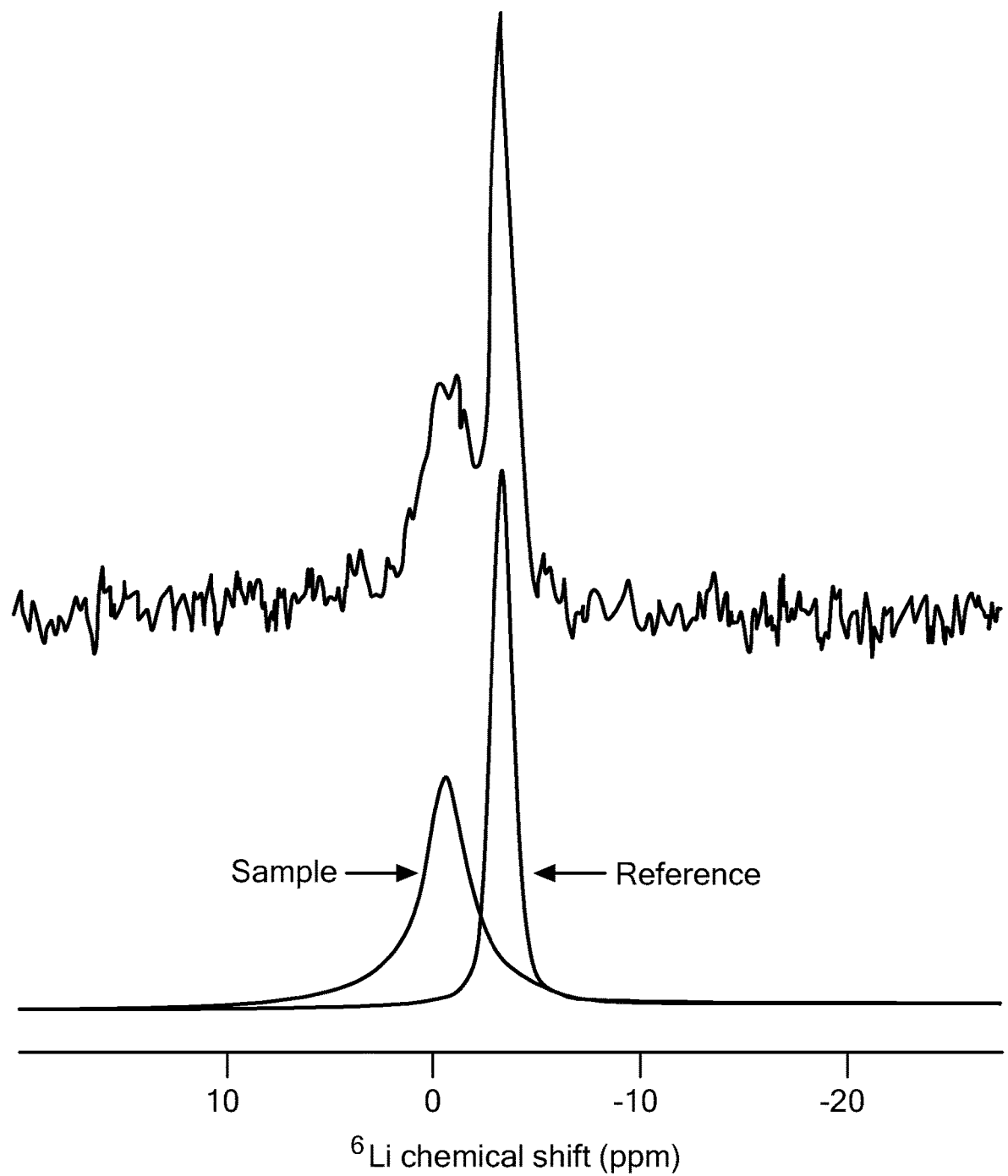
FIG. 15 is a NMR spectra of the material described in Example 19.

Quantification of the cation (e.g. lithium ion) concentration in the material from Example 3 can be accomplished by inserting the material into an interior coaxial tube and having it surrounded by an external reference solution of a shift reagent complex such as lithium Dysprosium polyphosphate (Dy). Referring to FIG. 15, a shift in Li cation resonance is induced by the paramagnetic Dy which allows the quantification of lithium in the sample. In the measured sample, the lithium cation concentration was found to be about three moles per liter of material ([Li]~3 mole/l). This large concentration of cation enables the solid ionically conductive material to possess very high ionic conductivity at room temperature and over a wide temperature range.

Material Stability

Liquid electrolytes and other polymer electrolytes can suffer from lithium stability issues. Their interaction with lithium results in a reaction between the lithium and the electrolyte which is disadvantageous for battery life. An electrolyte also needs to be compatible and non-reactive when used with other battery components such as electrochemically active materials including intercalation materials, electrically conductive additives, rheological agents and other additives. In addition, at high voltages, above 4.0 Volts, typical electrolytes can simply decompose which again results in poor battery life. Lithium "stability" is thus a requirement for a polymer electrolyte. Specifically, the polymer electrolyte is non-reactive and does not decompose while transporting lithium metal at voltages above 4.0V, 4.5V and 5.0V.

Figure 16:
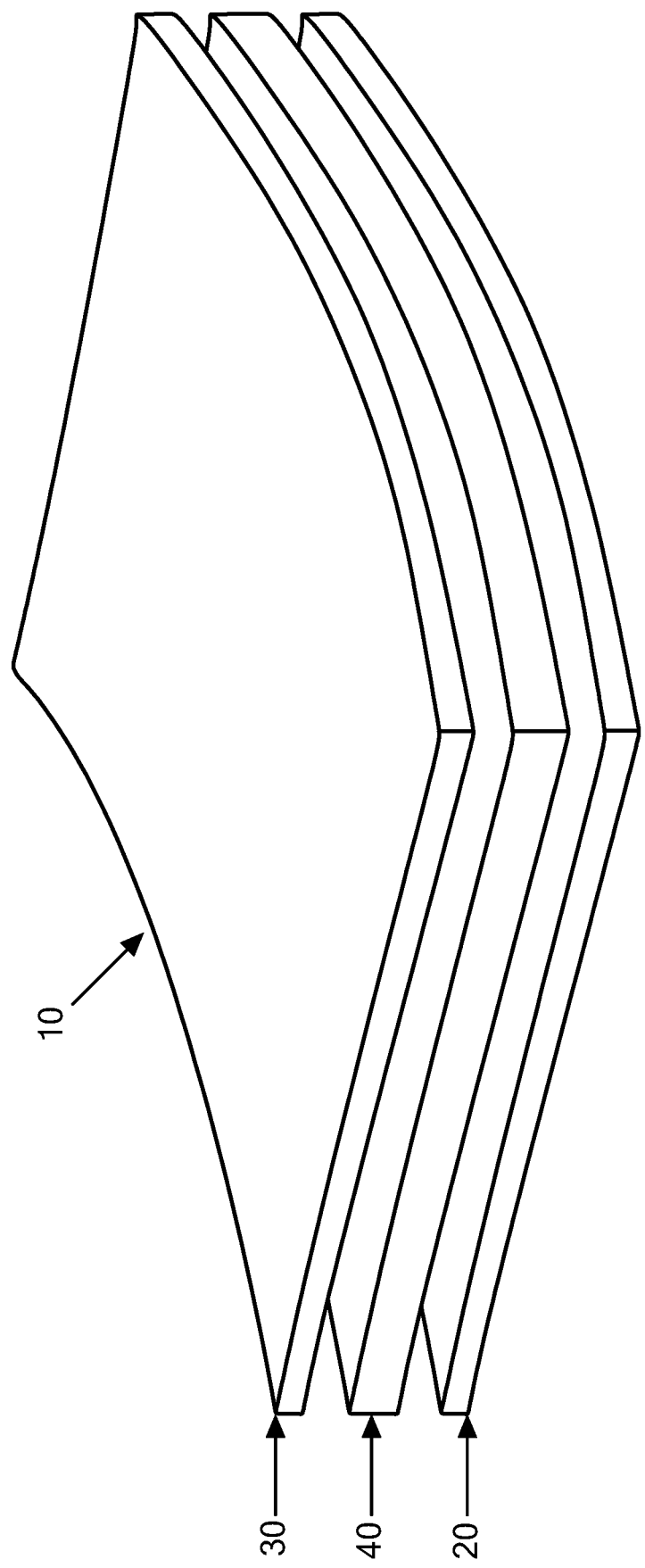
FIG. 16 is a graphic depiction of a battery using the material as described in Example 19.

Referring to FIG. 16, a thin film battery construction 10 is displayed. An anode comprises lithium metal 10 with an associated current collector (not shown), or an anode intercalation material typical of lithium ion batteries. If an intercalation material is chosen, the solid ionically conductive polymer material is intermixed therewith. A cathode 30 comprises both a cathode collector (not shown) and an electrochemically active material or intercalation material. Again the solid ionically conductive polymer material is mixed therewith along with an electrically conductive material. A film of the solid ionically conductive polymer material is used as a separator/electrolyte 40 and interposed between the anode and cathode.

Example 20

Figure 17:
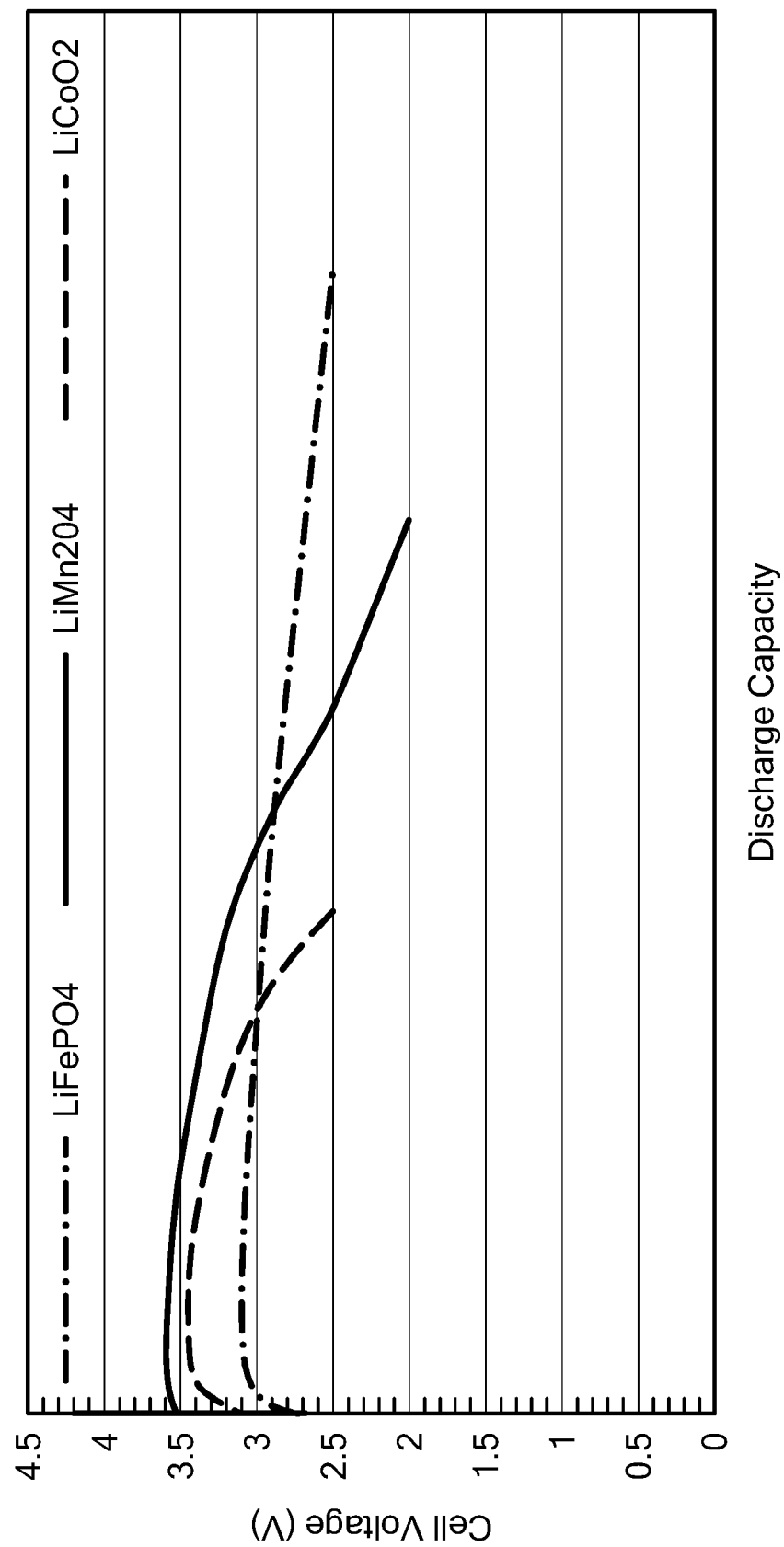
FIG. 17 is a discharge curve of three batteries as described in Example 20.

The solid ionically conductive polymer material demonstrates compatibility with a wide variety of current lithium ion chemistries. Referring to FIG. 17 performance of batteries constructed according to FIG. 16 and labeled according to the associated cathode electrochemically active material. Specifically, batteries were constructed with $LiFePO_4$, $LiMn_2O_4$ and $LiCoO_2$ cathodes, and lithium metal anodes. The batteries constructed with material of the present invention, which was mixed with electrochemically active material in the cathode, used as an electrolyte to conduct lithium ions to and from the anode and cathode and demonstrates appropriate discharge performance.

By using the solid polymer material as an electrolyte in all battery structures or in one of the structures (anode, cathode, separator and electrolyte) new levels of performance can be achieved without the use of any liquid electrolyte. The material can be intermixed with an electrochemically active material or an intercalation material in at least one of the electrodes. Ions necessary in the electrochemical reaction of the battery are conducted through the electrolyte. The material can be in a particulate, slurry, film or other form as befits the use in a battery. As a film, the material can be interposed between electrodes or between an electrode and a current collector, positioned encapsulating a current collector or electrode, or positioned anywhere where ionic conductivity is required. As described in FIG. 16 all three major components of a battery can be made using the solid polymer material. In the aspect shown in FIG. 16, the film shaped electrodes and the interposed separator or electrolyte can be independent structure or be affixed to each other by thermal welding or other means of integrating thermoplastic films.

Example 21

Figure 18:
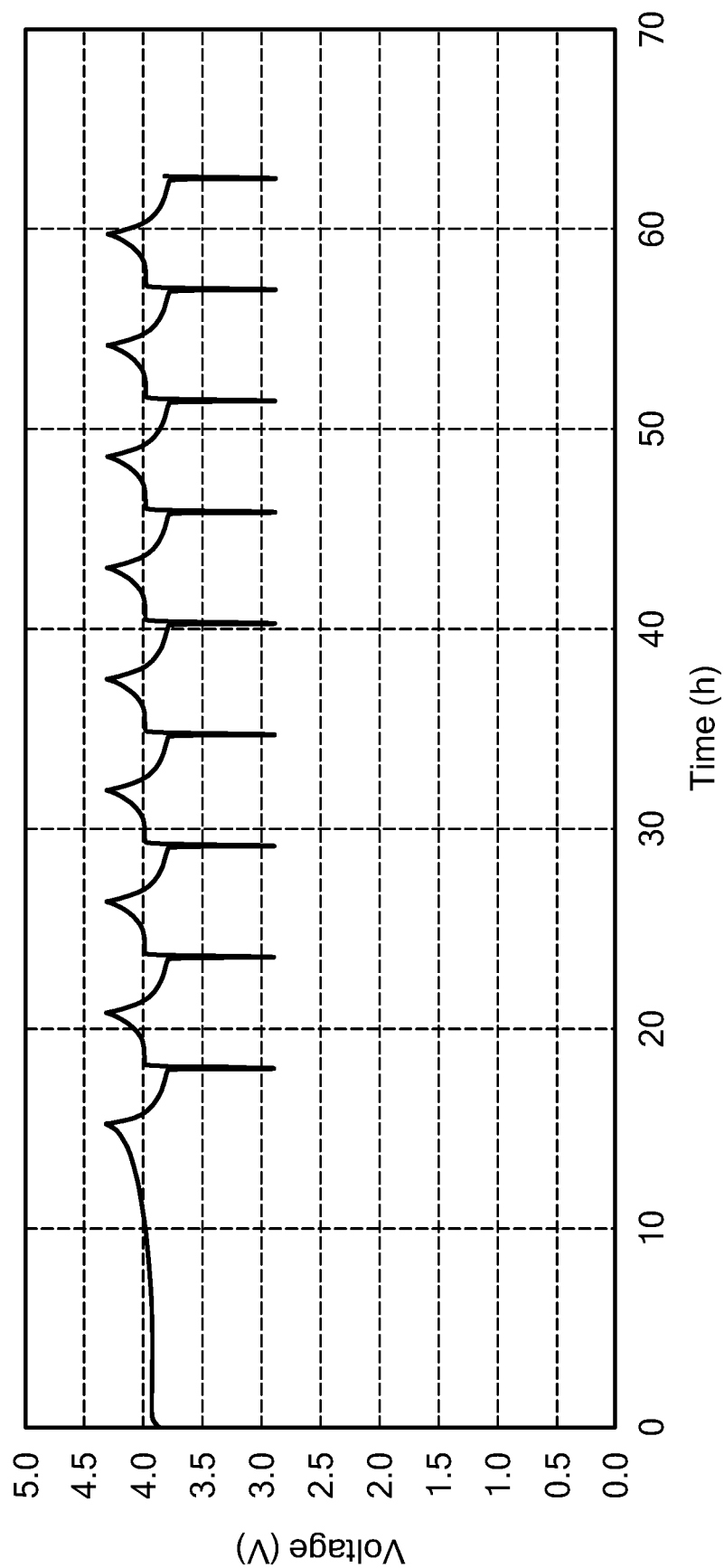
FIG. 18 is a discharge curve for the battery as described in Example 21.

A cathode was manufactured with LCO encapsulated by material from Example 1. The cathode was paired with a lithium metal anode and a film of the material was interposed between the anode and cathode as described in the construction of FIG. 16. The assembled battery was then charged and discharged through a plurality of cycles. FIG. 18 shows the resulting discharge curve over many cycles.

The charge-discharge curves show almost no polarization, and the efficiency is at least 99%. This result demonstrates the polymer's functionality as the ionic transport medium within the cathode and also its ability to serve as the electrolyte in a solid state battery. Also important is the voltage stability of the electrolyte while operating over four (4.0) Volts to 4.3V and to 5.0V, stability with lithium metal, and stability transporting lithium at rates in excess of 100 mAh/g (specifically at least:133.5 mAh/g lithium).

Example 22

A LiS battery is constructed which includes lithium metal anode and a sulfur cathode made in the construction described in FIG. 16. Material from Example 1 is used in making the battery, Traditionally, lithium-sulfur systems have struggled to overcome low cycle life caused by the dissolution of sulfur reaction chemical intermediaries in the liquid electrolyte typical of such batteries.

Figure 19:
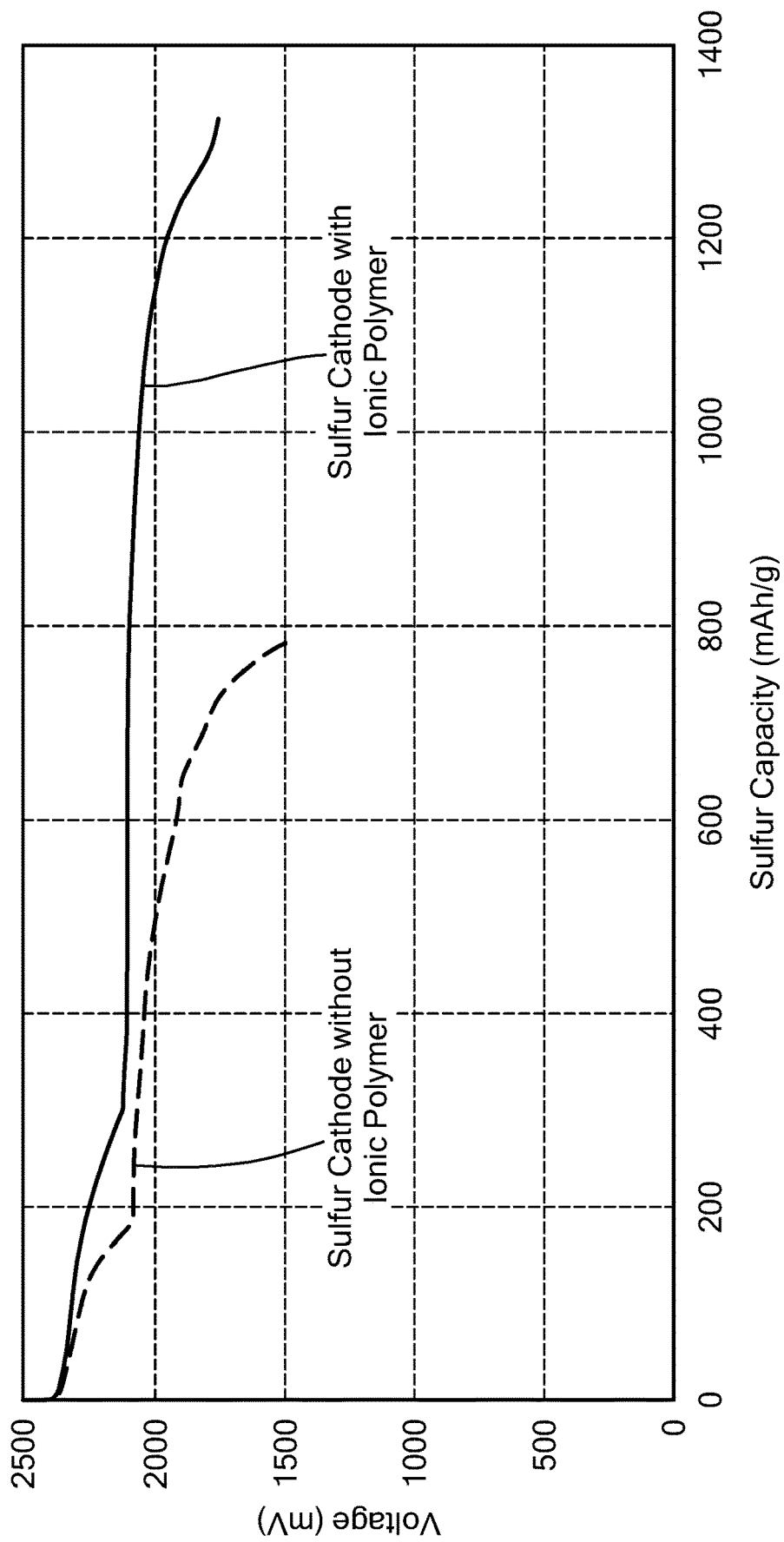
FIG. 19 is a discharge curve for the battery as described in Example 22.

The solid polymer material acts to enable a Li—S system by limiting this dissolution of reaction intermediates by capturing them in a solid system. The solid polymer material can transport lithium ions while blocking the polysulfide ion from reaching the anode. The solid polymer material limits the solubility of sulfur particles and transport of sulfides, thereby enabling more of the sulfur to participate in the reaction and improving the capacity of the cathode. This improved capacity relative a battery comprising a standard cathode containing only sulfur and carbon is shown in FIG. 19. Again, it is important to note that this data was taken at room temperature. The solid polymer material does not enable "indiscriminate diffusion" typical of liquid electrolytes and some typical polymer electrolytes but instead only enables diffusion of the ions that are incorporated into the material during synthesis. Thus sulfides cannot diffuse and are instead non-ionically conductive much like any other ion other than the diffusing anion(s) and cation(s). Thus the material can act as an ion separation membrane in that it can be engineered to enable ion mobility for only selected ions.

Solid Polymer Electrolyte

As described the solid ionically conducting polymer material acts as a solid electrolyte. As a solid electrolyte it obviates the need for a separator, but many of the same separator properties are required of a solid electrolyte.

A separator is a ion permeable membrane placed between a battery's anode and cathode. The main function of a separator is to keep the two electrodes apart to prevent electrical short circuits while also allowing the transport of ionic charge carriers that are needed to close the circuit during the passage of current in an electrochemical cell. This separation and ionic transport operations are required in all batteries.

A solid electrolyte must also be chemically stable against the electrode materials under the strongly reactive environments when the battery is repeatedly fully charged and discharged. The separator should not degrade during normal and abnormal uses of the battery. Of particular importance is voltage stability over the range of voltage encountered during charge and discharge.

A solid electrolyte must be thin to facilitate the battery's energy and power densities. However, the solid electrolyte must operate as a separator and cannot be too thin so as to compromise mechanical strength and safety. Thickness should be uniform to support many charging cycles. About 25.4 µm-(1.0 mil) and less than 30 micrometers is generally the standard width. The thickness of a solid electrolyte can be measured using the T411 om-83 method by the Technical Association of the Pulp and Paper Industry. and has been extruded in thicknesses from 5-150 micrometers.

Polymer separators typically increase the resistance of the electrolyte by a factor of four to five, and deviations from uniform permeability produce uneven current density distribution, which causes the formation of dendrites. Both issues can be eliminated with the use of solid electrolyte that yields uniformity of and possesses isotropic ion conductivity.

The solid electrolyte must be strong enough to withstand the tension of any winding operation during battery assembly, or bending or other abuse of the battery. Mechanical strength is typically defined in terms of the tensile strength in both the machine (winding) direction and the transverse direction, in terms of tear resistance and puncture strength. These parameters are defined in terms of Young's modulus which is the ratio of stress to strain. The range of Young's modulus for the electrolyte made from the solid polymer material is 3.0 MPa-4.0 GPa, and it can be engineered to be higher by utilizing additives such as glass fiber or carbon fiber if required.

The solid electrolyte must remain stable over a wide temperature range without curling or puckering, laying completely flat. Although the ionic transport properties of the solid electrolyte of the present invention vary with temperature the structural integrity remains stable even when exposed to extreme heat as will be more fully described below.

Thus the solid ionically conducting polymer material meets the requires of a separator and solid polymer electrolyte as it performs each of the above listed requirements. Specifically, the solid polymer electrolyte possesses a Young's modulus greater than 3.0 MPa, thickness less than 50 micrometers, isotropic ionic conductivity, diffusivity of multiple ions at temperatures as low as −45° C., stability (non-reactive) with lithium metal, electrochemically active materials, and electrically conductive additives at high voltages, thermoplastic, and moldable.

Example 23

The solid polymer material was tested for flammability according to the parameters of the UL 94-V0 Flammability Test. The solid polymer material was found to be virtually non-flammable—self-extinguishing in two seconds. By UL94-V0 standards, in order to be considered nonflammable, the material needs to self-extinguish in less than ten seconds.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An electrolyte material comprising:
    a solid ionically conductive polymer having a semi-crystalline or crystalline structure;
    wherein the solid ionically conductive polymer is formed from a base polymer, an ionic compound and an electron acceptor;
    wherein the solid, ionically conductive polymer has an ionic conductivity greater than $1 \times 10^{-4}$ S/cm at room temperature;
    wherein the base polymer is a polyether ether ketone, polyphenylene sulfide, a liquid crystal polymer, or a semi-crystalline polymer with a crystallinity index greater than 30%;
    wherein the ionic compound is an oxide, a hydroxide or a salt; and
    wherein the electron acceptor is 2,3-dichloro-5,6-dicyano-1,4-benzoquinone, tetracyano-ethylene or chloranil.

2. The material of claim 1, wherein the base polymer has a melting temperature which is greater than 250° C.

3. The material of claim 1,
    wherein the material comprises a diffusing cation; and
    wherein the diffusing cation is monovalent.

4. The material of claim 1,
    wherein the material comprises a cationic diffusing ion; and
    wherein the cationic diffusing ion comprises lithium.

5. The material of claim 1,
    wherein the material comprises a diffusing anion; and
    wherein diffusing anion is monovalent.

6. The material of claim 1,
    wherein the material comprises a diffusing anion; and
    wherein the diffusing anion is a hydroxyl ion.

7. The material of claim 1,
    wherein the material comprises a diffusing anion and a diffusing cation; and
    wherein each of the diffusing anion and the diffusing cation are monovalent.

8. The material of claim 1, wherein the ionic crystalline or semi-crystalline polymer comprises a plurality of monomer residues; and
    wherein a molecular weight of each monomer residue of the plurality of monomer residues is greater than 100 grams/mole.

9. The material of claim 1, wherein the ionic conductivity is greater than $1 \times 10^{-3}$ S/cm at room temperature.

10. The material of claim 1, wherein the material exhibits a UL 94 V-0 flame retardancy.

11. The material of claim 1, wherein the material is in the shape of a film.

12. The material of claim 1, wherein the material is formed by a method including a step of doping with the electron acceptor.

* * * * *